Figure 1:
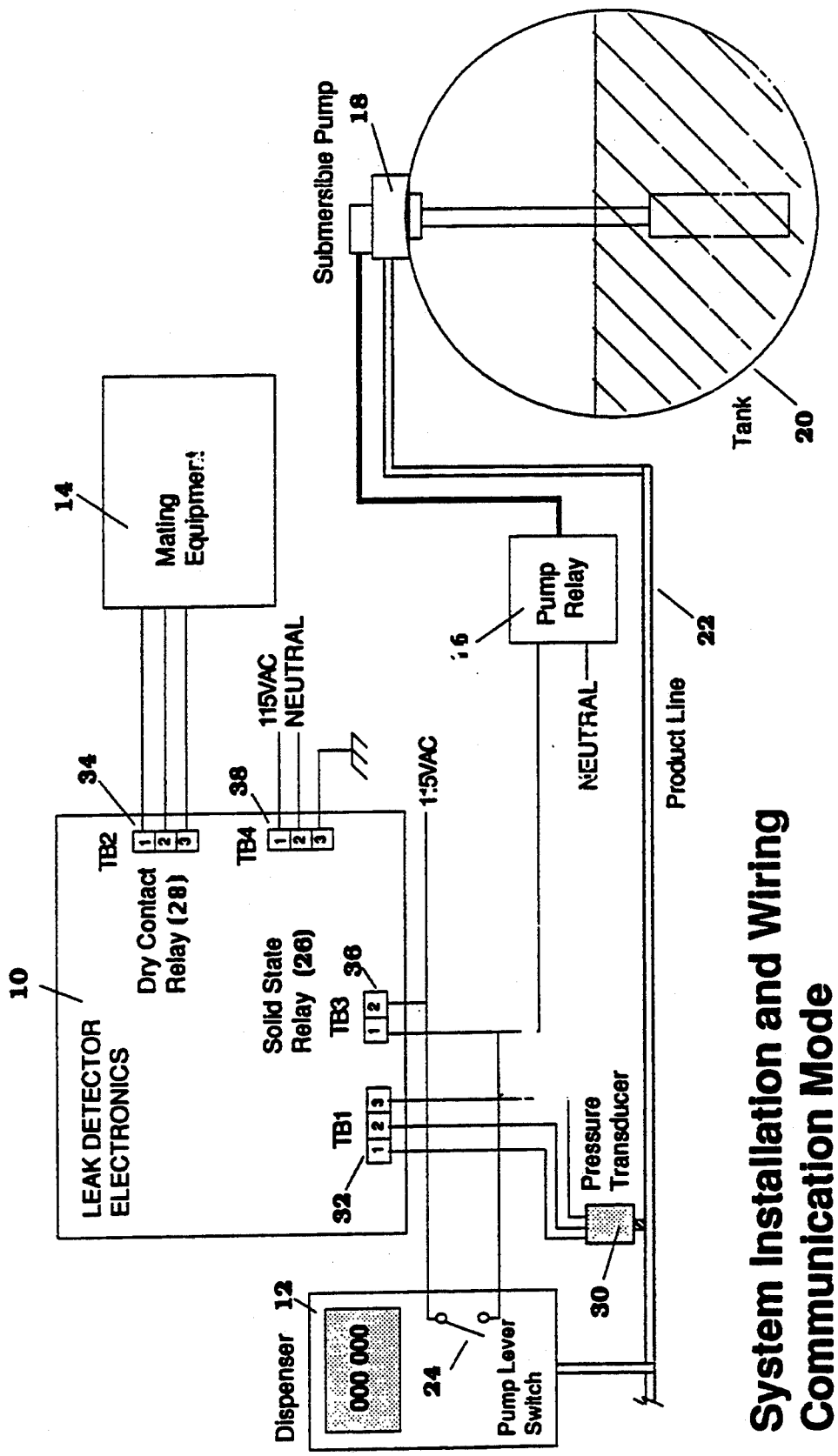

United States Patent [19]

Filippi et al.

[11] Patent Number: 5,372,032
[45] Date of Patent: Dec. 13, 1994

[54] PRESSURIZED PIPING LINE LEAK DETECTOR

[76] Inventors: Ernest A. Filippi, P.O. Box 1809, Porterville, Calif. 93258; Kenneth L. Miller, 1819 Bardale Ave., San Pedro, Calif. 90731

[21] Appl. No.: 51,232

[22] Filed: Apr. 23, 1993

[51] Int. Cl.$^5$ .............................................. G01M 3/26
[52] U.S. Cl. ................................ 73/40.5 R; 340/605; 364/558
[58] Field of Search ................ 73/40.5 R; 340/605; 364/558; 222/52

[56] References Cited

U.S. PATENT DOCUMENTS

| | | | |
|---|---|---|---|
| 3,738,531 | 6/1973 | Mitchell | 222/52 |
| 3,935,567 | 1/1976 | Reynolds | 340/242 |
| 3,982,664 | 9/1976 | Robbins | 222/21 |
| 4,131,216 | 12/1978 | Gerstenmaier | 222/52 |
| 4,161,957 | 7/1979 | Schoellkopf | 137/205 |
| 4,308,746 | 1/1982 | Covington | 73/40.5 R |
| 4,361,030 | 11/1982 | Heide | 73/40.5 R |
| 4,496,077 | 1/1985 | Zuehlsdorf | 222/61 |
| 4,523,452 | 6/1985 | Brayman | 73/40 |
| 4,590,793 | 5/1986 | Staats | 73/40 |
| 4,608,857 | 9/1986 | Mertens | 73/40 |
| 4,658,986 | 4/1987 | Freed | 222/52 |
| 4,723,441 | 2/1988 | Sweeney | 73/40.5 R |
| 4,797,007 | 1/1989 | Elmore | 374/143 |
| 4,811,252 | 3/1989 | Furuse | 364/556 |
| 4,835,717 | 5/1989 | Michel | 364/558 |
| 4,852,054 | 7/1989 | Mastandrea | 364/509 |
| 4,876,530 | 10/1989 | Hill | 340/605 |
| 4,958,296 | 9/1990 | Saitoh | 364/509 |
| 5,042,290 | 8/1991 | Geisinger | 73/40.5 R |
| 5,065,616 | 11/1991 | Schuster | 73/49.2 |
| 5,072,621 | 9/1991 | Hasselmann | 73/40.5 R |
| 5,078,006 | 1/1992 | Maresca | 73/40.5 R |
| 5,086,403 | 2/1992 | Slocum et al. | 364/558 |
| 5,090,234 | 2/1992 | Maresca | 73/49.1 |
| 5,102,012 | 4/1992 | Foster | 222/40 |
| 5,103,410 | 4/1992 | Slocum | 364/558 |
| 5,201,212 | 4/1993 | Williams | 73/40.5 R |

*Primary Examiner*—Hezron E. Williams
*Assistant Examiner*—Joseph W. Roskos
*Attorney, Agent, or Firm*—Sixbey, Friedman, Leedom & Ferguson

[57] ABSTRACT

A line leak detector system that requires no existing piping modifiction for installation. The system consists of a controller and transducer and installs at existing fuel dispensers. The two components are connected by a length of electrical cable. The invention detects leaks in underground pressurized piping systems for fuel products and other incompressible liquids. The system performs three levels of leak detection, broken pipe, 3 gph and 0.2 gph. Existing piping system variables relating to bulk modulus, variable pump off pressure and thermal differential between fuel and piping with surrounding soil influence, are compensated for. The status of the leak test is reported by encoded lights and horn. In various combination of flash, blink and steady state lights, plus chirp or audible horn. The transducer and cable are intrinsic safe, permitting installation in hazardous environments. The system permits selection of functional modes, thereby making the system able to report leak status to existing underground fuel tank inventory systems.

46 Claims, 12 Drawing Sheets

System Installation and Wiring Communication Mode

System Installation and Wiring
Stand-alone Mode
Fig #2

LEAK DETECTOR
SCHEMATIC

POWER SUPPLY
SCHEMATIC

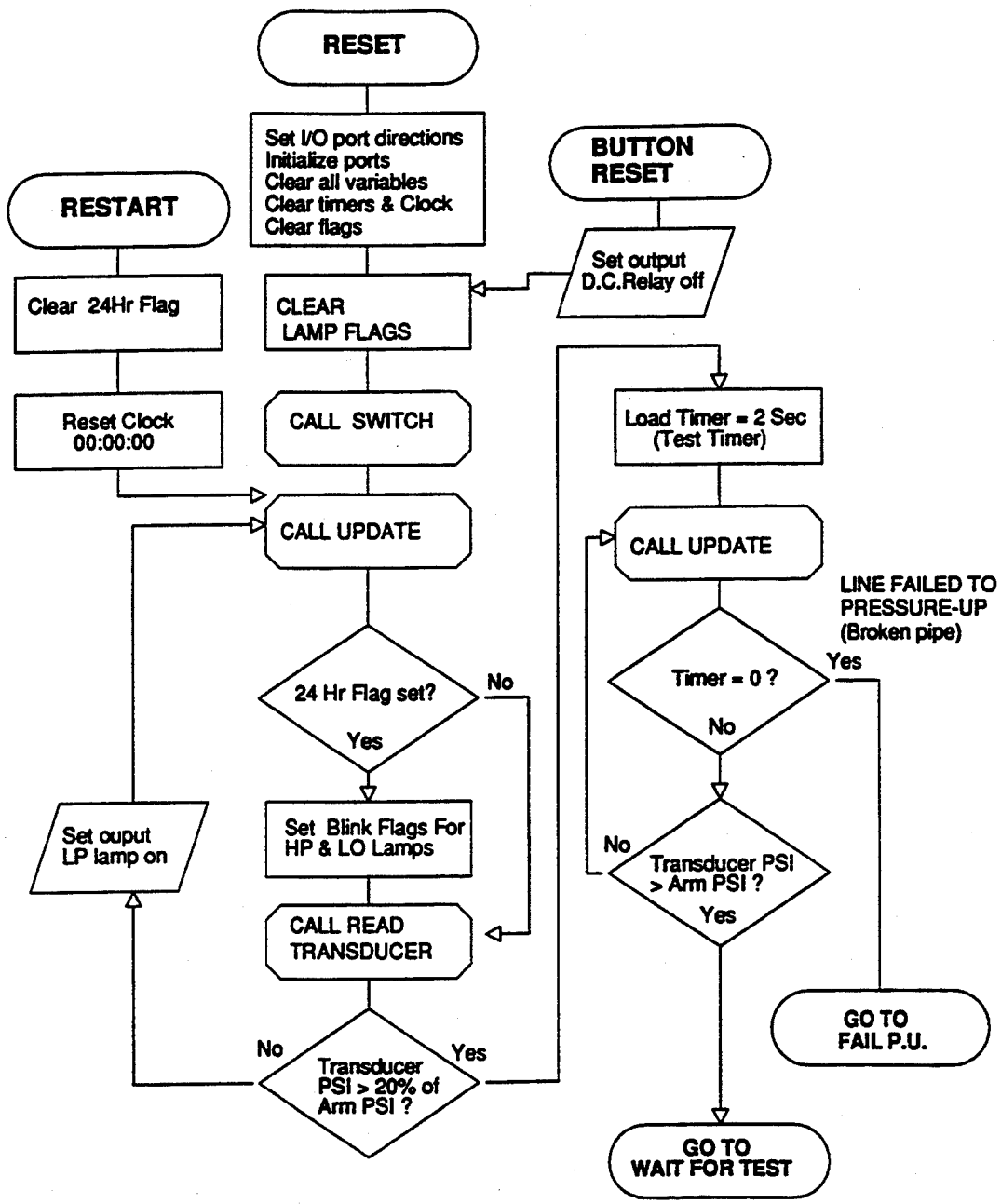
Flowchart RESET
Fig # 5

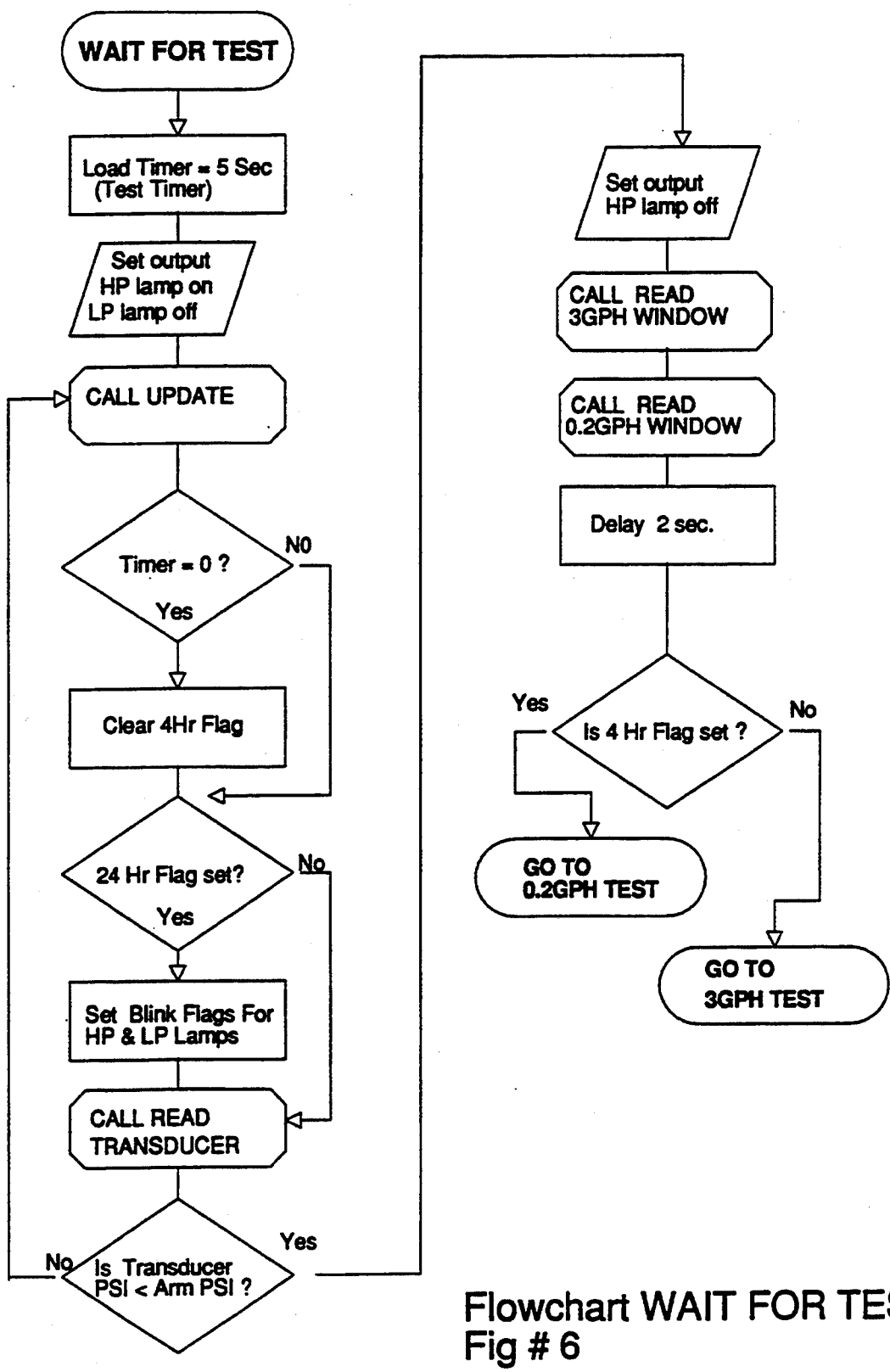
Flowchart WAIT FOR TEST
Fig # 6

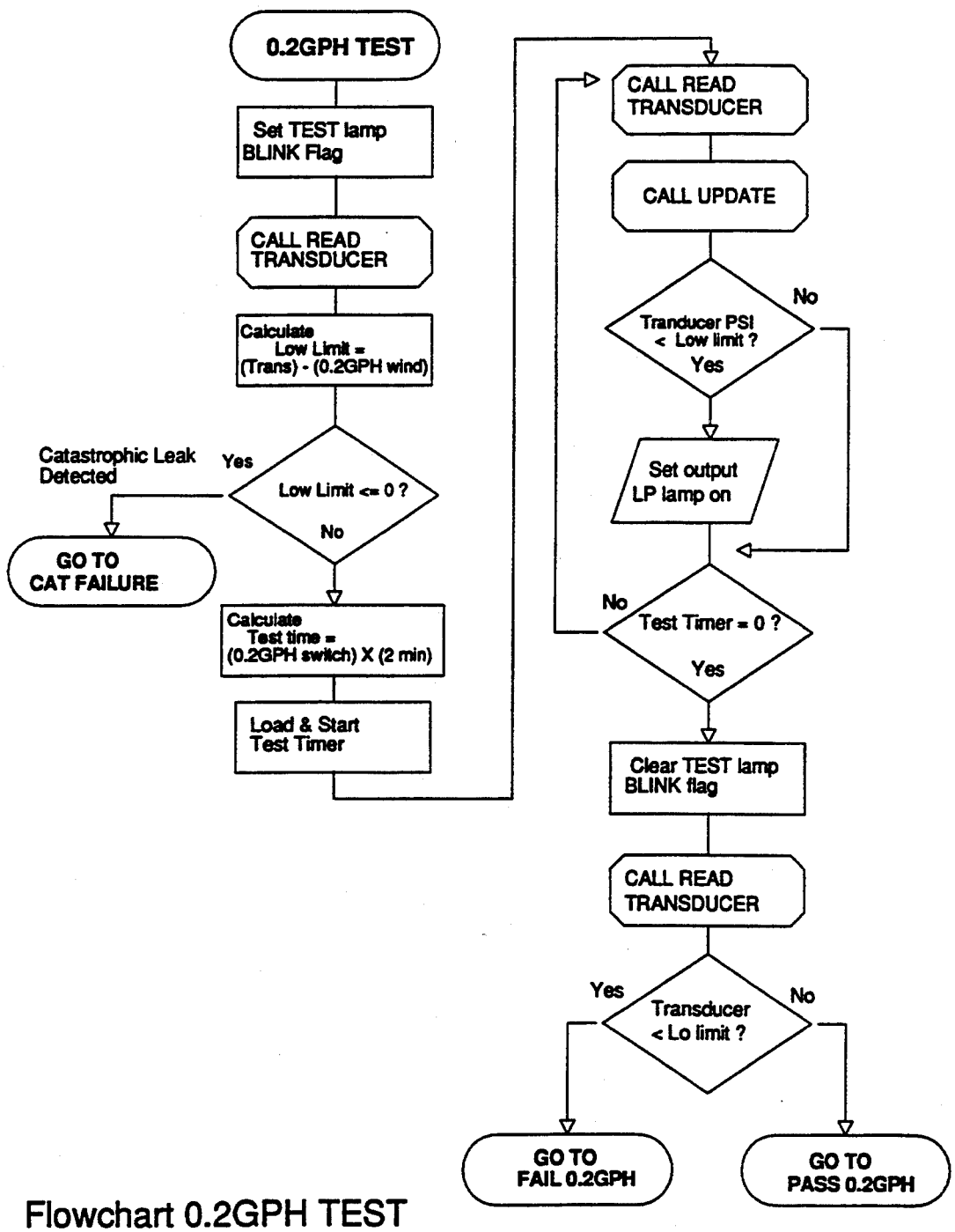
Flowchart 0.2GPH TEST
Fig # 7

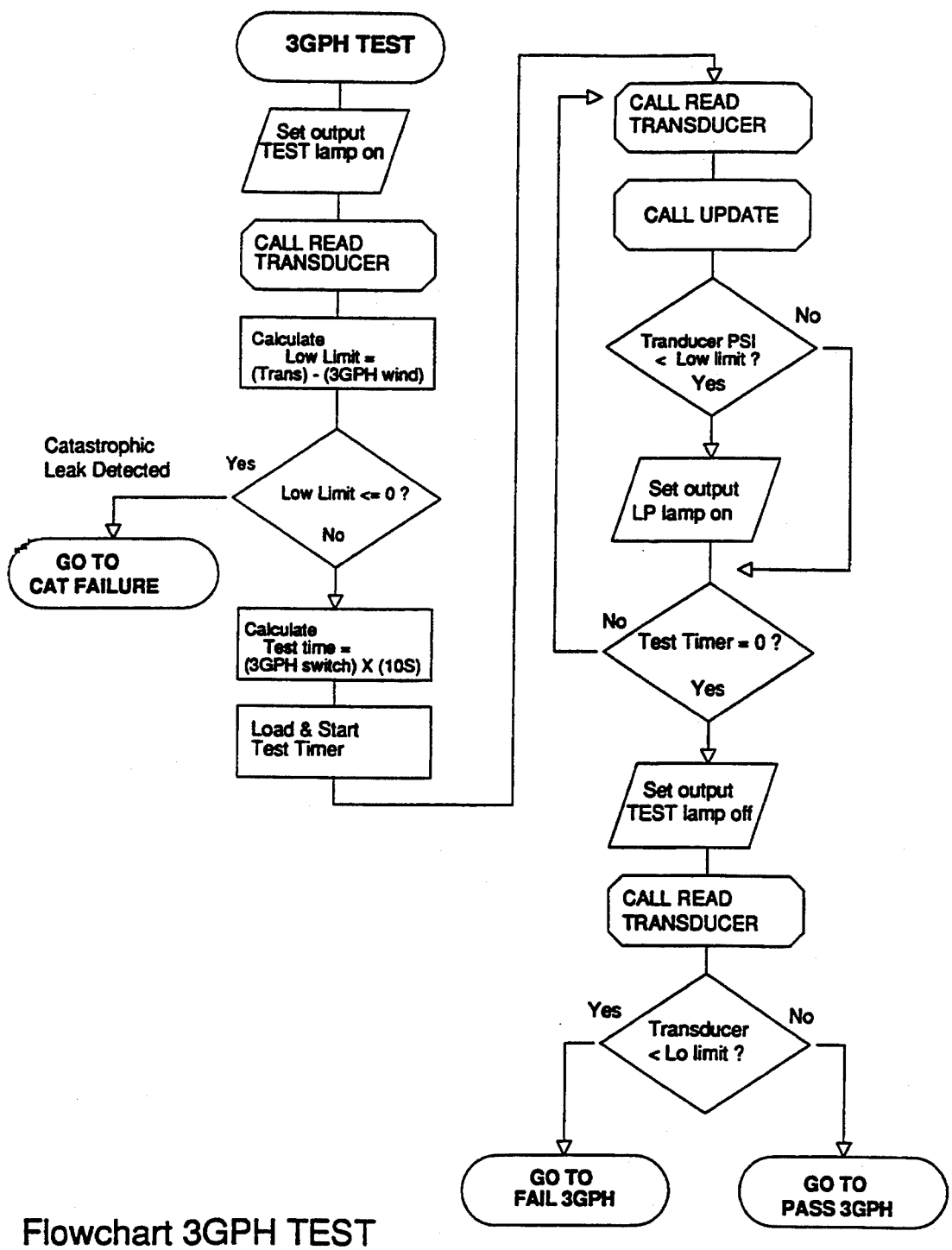
Flowchart 3GPH TEST
Fig # 8

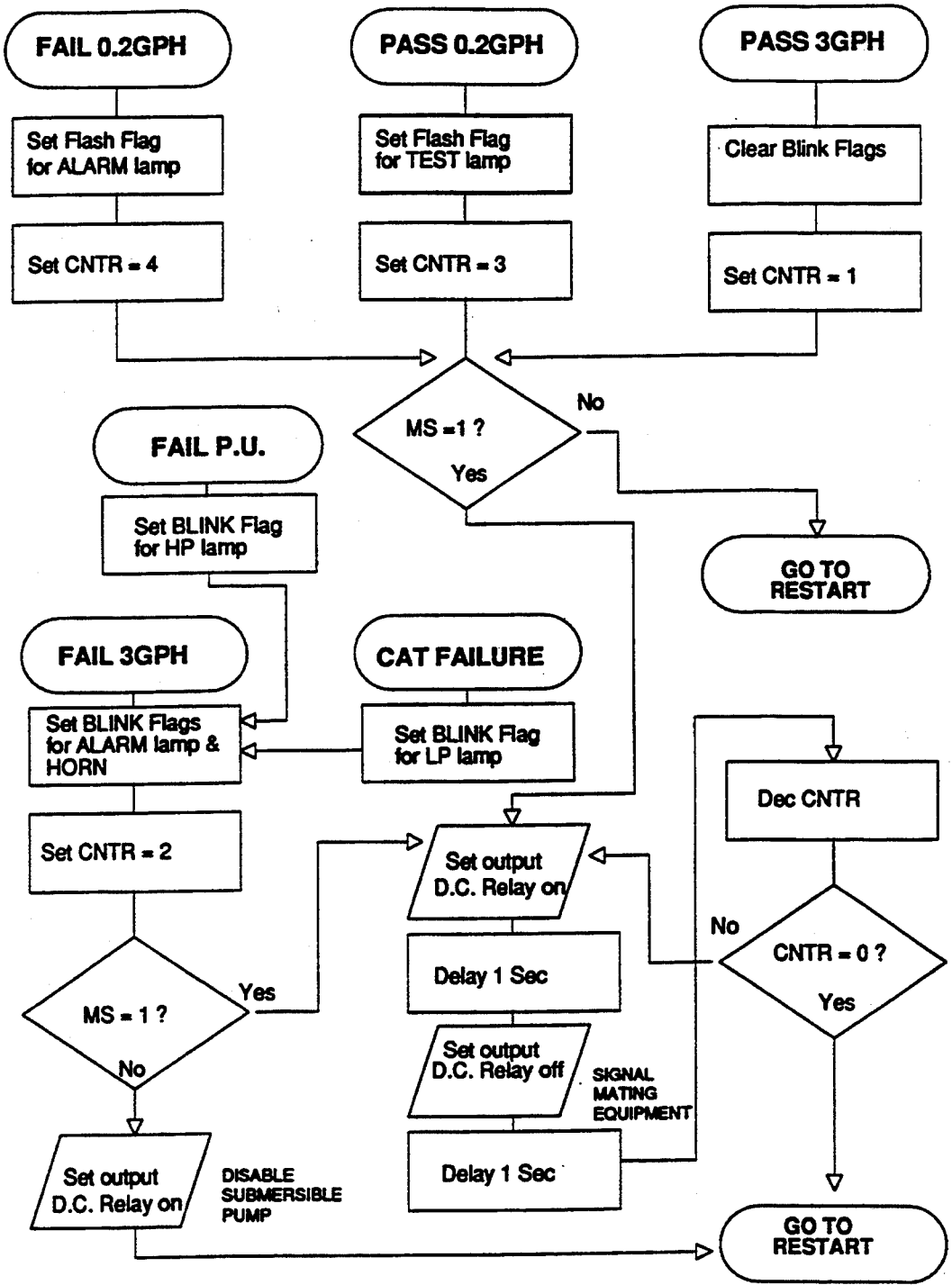
Flowchart End Test
Fig # 9

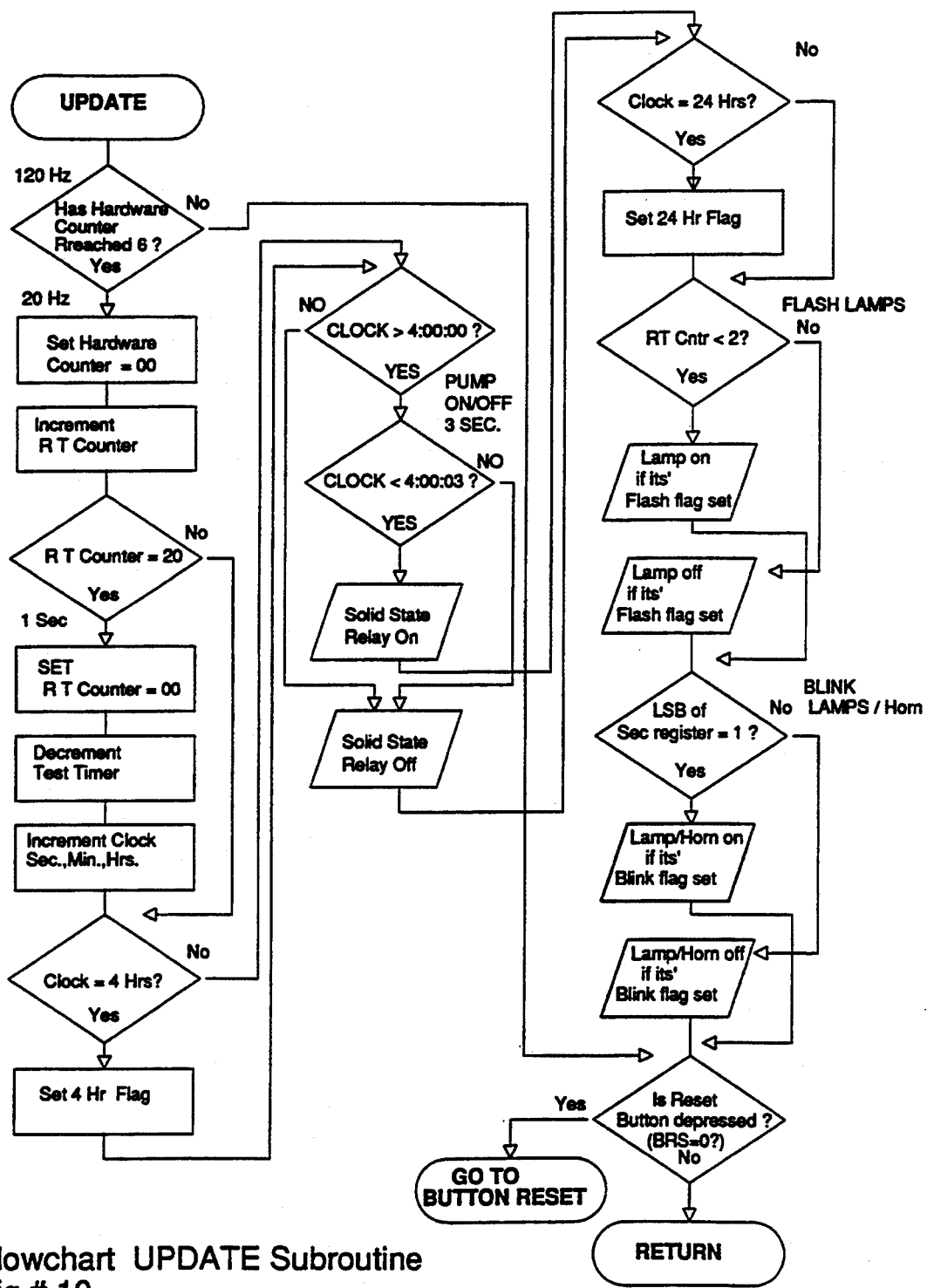
Flowchart UPDATE Subroutine
Fig # 10

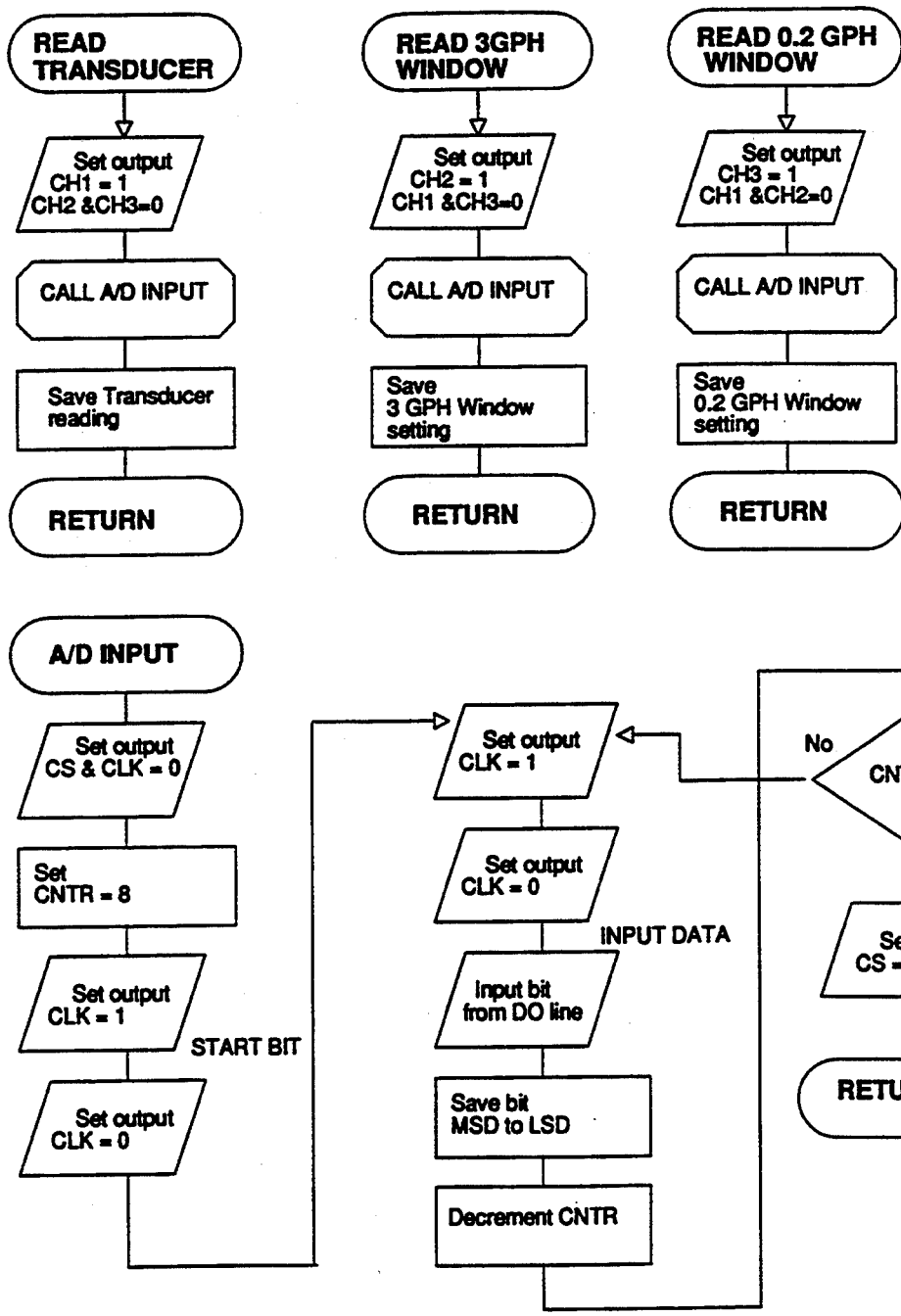
Flowchart A/D INPUT Subroutines
Fig # 11

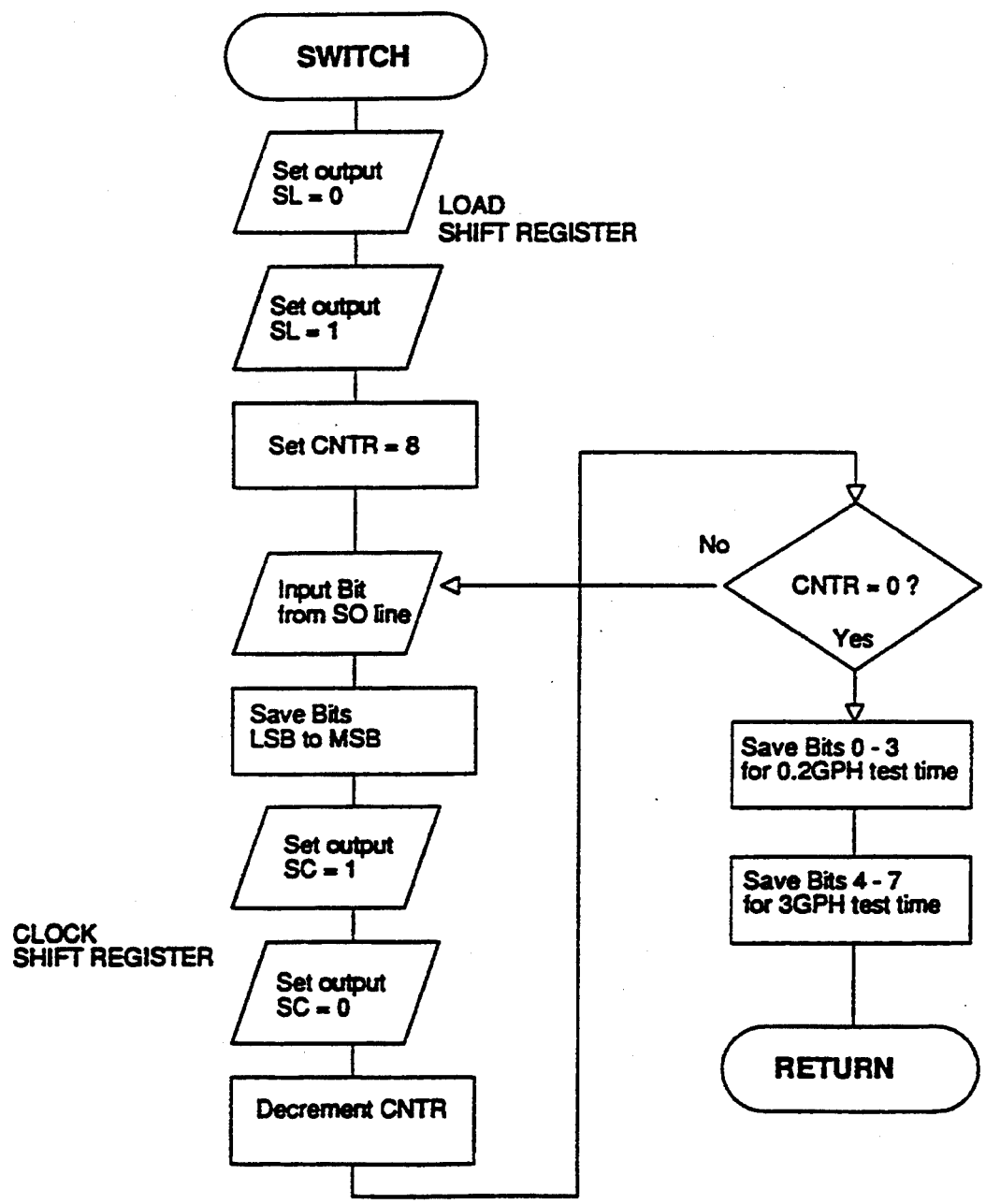
Flowchart
SWITCH Subroutine
Fig # 12

PRESSURIZED PIPING LINE LEAK DETECTOR

BACKGROUND OF THE INVENTION

1. Field of the Invention

This invention relates to the detection of leaks in underground pressurized piping, used for fluid transmission of hydrocarbon fuels, and other incompressible hazardous fluids. Federal and State environmental protection regulatory laws, mandate such leak detection devices.

2. Description of Prior Art

A myriad of devices have been available, attempting to perform line leak detection, on underground pressurized piping. These devices break down into categories of mechanical and electro-mechanical designs. Leak rate determination breaks down into categories of pressure decay and flow.

With the advent of the micro-computer and associated circuitry, the electro-mechanical designs, have taken on a sophistication heretofore not available. The intelligent circuitry permits a level of decision making that has made available leak detection rates that were previously impossible.

Prior to intelligent circuits, leak detectors sensed the time to pressure up or the time to pressure down, with pump turn on or off, and alarmed when the preset value was exceeded. These devices had no capability to discriminate between effects caused by leaks and thermal expansion or contraction. Additionally deleterious effects caused by trapped air or piping springiness were ignored.

New Federal and State requirements for leak detection specify leak rate detection at leak rates, beyond the capability of the old traditional designs. The new designs utilizing intelligent circuits, employ two fundamental approaches for leak detection, pressure decay or flow.

The pressure decay devices measure the pressure drop to a predetermined level over time, and compensate for temperature change, by taking temperature readings or changes of time to a predetermined pressure level, by taking multiple tests. Limits are set for temperature or time changes, when exceeded a no test is signalled. The effects from air or piping springiness, is compensated for, by setting standards to typical values for both.

The flow devices measure any flow detected when pumping pressure is supplied for a predetermined time interval against a closed nozzle. Various strategies are employed to determine a no test condition caused by out of limit temperature differentials. The effects from air or piping springiness is compensated for by the constant pressure applied during the test cycle.

Strategies employed by existing pressure decay or flow devices, concerning the effects from a temperature differential between fluid and soil, that cause fluid expansion or contracting, do not eliminate the effect, but only declare a no test condition, when the effect is beyond a prescribed limit. The result of this circumstance may be many no test status results, usually during extreme weather conditions.

The springiness of a piping system or air in the system, can be represented by the system bulk modulus value. The piping systems relative bulk modulus, can be determined by the fluid volume release, from any test pressure. For any fuel piping system in continuous use, the bulk modulus is usually constant.

For a pressure decay detector the effects of the piping bulk modulus, can be easily compensated for, because the bulk modulus is always a constant value, for piping in continuous use.

For a flow detector the effects of the piping bulk modulus, is automatically compensated for, by the constant pumping pressure applied during the flow test, for a leak.

A temperature condition refers to the difference of temperature, between the fluid in the pipe and the surrounding soil. When the fluid is hotter than the pipe, pressure is lost over time. When the fluid is colder than the pipe, pressure is gained over time. The primary fluid is gasoline, the coefficient of thermal expansion for gasoline fuels is 6 to 7 times that of water, small temperature changes can result in large pressure changes. These changes can result in false leak detection reporting, in both directions. Both pressure decay and flow measurement devices, are sensitive to temperature differentials of the piping fluid and the soil. Motor fuels are stored primarily in underground tanks, often fuel in the tank is a different temperature, than the piping, that delivers fuel to the dispenser.

Temperature differentials of less than 1 degree centigrade, can cause pressure fluctuations as great as 10 psi, in pressurized piping.

Pressure decay devices that utilize sequential pressure-up cycles, will introduce heat into the piping fluid under test.

Likewise flow devices that utilize constant pressure, from pump operation, are additionally likely to introduce heat into the piping fluid.

The source of heat is due to fluid hysteresis, caused by the pulsation of the fluid in the piping. The design of submersible pumps turbine wheel, creates the fluid pulsation, thereby introducing heat into the fluid, under pressure.

Pressure decay devices, depend on the turbine pumps, combination check/pressure-relief valve, to capture the fluid under test, with a pressure drive. Usually the pumps operating pressure is 20 to 30 psi and the pumps off pressure is 8 to 12 psi. Generally for a 3 gph test, any post pressure held above 4 psi for 10 seconds is declared a pass. For this test the effects of temperature differentials, are removed, due to short time of test. The test is said to fail within the adiabatic regime. For a precision test 0.1 to 0.2 gph, the test must be for a significantly longer duration. For a normal bulk modulus and for a 0.2 gph test, a 5–10 minute duration test is usually required. With a relatively low starting test pressure, that will decrease as fluid is released, sensitivity to the fluid/piping temperature differentials, can create false leak reporting. Existing strategies are to record temperature gains or losses, during the test, or to perform sequential tests looking for a time differential to a predetermined pressure setting. Sequential tests, requiring pump operation, risks fluid heating from turbine pump pulsation. Temperature recordation during the test, is subject to sensor location along the length of the piping. A single sensor may miss a temperature differential, somewhere along the length of the piping system. Pressure decay leak detection devices test the residual pressure, trapped in the piping system after pump shut-off. Submersible turbine pumps are equipped with valves, that acts as a check against pressure loss, but also as a pressure relief valve. It is necessary to trap pressure in the line from pump to dispenser, to prevent draining of the line, draining of the line would allow air into the line. Air trapped in the pump to dispenser line, would cause an incorrect metering of product through the dispenser. The pressure relief valve is required, to prevent over pressurizing the line, from product expansion on a hot day. Usual pumping pressures of a new pump, against a closed nozzle is 30 psi, while pump off pressures are 10 psi.

Some submersible pump manufacturers supply pumps, with 30 psi pumping pressures and 45 psi pressure relief valves. Since the higher relief pressure is seldom reached, a lower cost valve can be used. The majority of pumps operate at 30 psi and 10 psi off, most pressure decay devices are compatible with that range. Pressure decay leak detectors rely upon the pumps valving to successfully relieve pressure to the nominal 10 psi. For the 3 gph test, nominally, if the trapped pressure remains above 4 psi, for 10 seconds, the test is declared a pass. For the 0.1 or 0.2 gph test, nominally, if the trapped pressure remains above 7 psi for 5 to 10 minutes, the test is declared a pass, providing a temperature condition is not sensed. Should the pumps valving fail to trap pressure, a false leak will be declared. Should the pumps valving fail to trap pressure, always at the same level, the expected range of allowed pressure decay will be reduced or increased, the result will be a more sensitive or less sensitive test. Older pumps with worn valving and debris in the product, usually do not exhibit a good tolerance around the nominal relief pressure settings.

Most flow sensing leak detection devices depend on turbine pumps to supply the constant pressure, for the leak test. The flow sensing device diverts flow from the submersible pump, through an orificed flow detector. With the dispensing nozzle closed, any flow through the flow sensor, is evaluated as a reportable leak, depending on the reporting threshold. The piping system springiness and air entrapped (bulk modulus) is effectively eliminated as a variable in the leak rate determination. Temperature differentials, between the test fluid and the piping remain as critical as with pressure decay devices. The strategies for determining temperature differentials are essentially the same as for pressure decay devices. However, one potentially damaging difference does exist, for pressure decay the pump is off, however, for flow the pump is on. The pump for flow is on, to generate a constant pressure, for the flow test, thereby removing any effect from the system bulk modulus. However, the turbine pump itself, is a source of fluid/piping temperature differential, due to the fluid pulsing caused by the pumps turbine wheel. The additional heat put into the fluid, has the potential to compensate for fluid loss, due to a hole in the piping, by a possible equal expansion of the heated fluid. Remembering that a temperature increase as little as 1 degree centigrade can increase pressure as much as 10 psi for gasoline.

Detecting gross leaks (broken pipe) or leaks as small as 3 gph is easily within the state-of-the-art for most leak detection devices currently available. However for those devices, adding a reliability of performance of 95% detection and 5% false alarm narrows the number of leak detectors that comply. Then add degradation from aging, maintenance and environmental extremes and the number of leak detectors that comply narrows substantially.

Detection of precision leaks in the range of 0.1 to 0.2 gph requires a new level of sophistication. For precision leak detection, a leak detector must compensate for the piping bulk modulus and the temperature differential between fluid and pipe. Existing technology presents pressure decay and flow sensing solutions. However solutions presented currently have failed to recognize, their built in short comings. Therefore more than adequate room is left for additional patents in our opinion.

The following patents are examples of pressure decay line leak detectors:

| Reynolds; | 3,935,567 | January 27, 1976 |
| Elmore III; | 4,797,007 | January 10, 1989 |
| Michel Et Al; | 4,835,717 | May 30, 1989 |
| Hill Et Al; | 4,876,530 | October 24, 1989 |
| Slocum Et Al; | 5,103,410 | April 7, 1992 |

The following patents are examples of flow sensing line leak detectors:

| Gerstenmaier Et Al; | 4,131,216 | December 26, 1978 |
| Maresca, Jr. Et Al; | 5,078,006 | January 7, 1992 |
| Maresca, Jr. Et Al; | 5,090,234 | February 25, 1992 |

Referring to Reynolds, the line leak detector therein described, fails to compensate for piping bulk modulus, temperature and differing pump off pressures. This device will not reliably find leaks below 3 gph.

Referring to Elmore, III, the line leak detector therein described attempts to compensate for temperature, but fails to incorporate the micro-processor logic necessary for piping bulk modulus and variable pump off pressures.

Referring to Michel Et Al, the line leak detector therein described incorporates a micro-processor to interpret data from a temperature sensor, in order to compensate for fuel/pipe temperature differentials. The device fails to recognize that a single point temperature measurement, does not represent the temperature differentials along the entire length of piping. Additionally, this device fails to compensate for the piping bulk modulus and variable pump off pressures.

Referring to Hill Et Al, the line leak detector therein described incorporates various means to compensate for temperature, bulk modulus and variable pump off pressure, however, their performance is limited to a narrow range, that is insufficient for real world conditions. Temperature differentials between fuel and piping are detected by sequential testing, looking for a decrease in the time to a threshold pressure. When the decrease occurs, the effect is interpreted as due to temperature. Testing is continued until no difference is recorded in the time to the threshold pressure. If the time remains longer than 8 seconds no alarm is activated. This approach ignores the fact that sequential pump operation, itself introduces heat into the fluid, and thereby precludes an accurate measurement. Additionally, leaks below 3 gph cannot be detected in the 8 second time and 5 psi decay. Compensation for differing piping bulk modulus is determined by any time greater than two seconds to achieve 15 psi, after pump shut down. This approach will only work over narrow limits, when the check/relief valves performance is tailored to a specific release rate. Compensation for variable pump off pressure, is attempted to be achieved by a spring loaded piston, delivering make-up fluid to the pressure trapped by the check/relief valve, when the pressure drop is below 12 psi. This device is limited by its range of 4 to 11 psi and its fluid volume of 5 cubic inches. The attempt is to persuade the pump off pressure to always be 10 psi. Considering spring force degradation over time and the make-up volume limit, not to mention the spring force degradation of the pressure relief valve, it certainly is an impossible task.

Referring to Slocum Et Al, the line leak detector therein described incorporates many of the features of Michel Et Al, with some improvements. The primary improvement being an anti-thwart switch, that prevents continuously resetting the leak detector, by laying a brick on the reset switch. This patent does not address or describe any means, whereby any temperature differential, along the entire length of piping, are sensed. A single point or even a multiple fluid temperature sensing points, may miss a section of piping wherein significant temperature gradients may exist. In that situation a probe may indicate no temperature, wherein in fact there is a temperature gradient, further down the pipe which may create significant pressure differentials. A practical example of such a condition would be piping from a dispenser under a canopy. The canopy shades the piping thereunder, but does not shade the piping as it terminates to the underground tank. In that case a temperature sensor under the canopy, would not sense the same temperature as the fuel in the piping that is not shaded, but in fact is warming up. This condition poses a significant restraint to finding a precision leak, with the leak detector herein described. The patent additionally fails to perform the precision leak test on any system that does not have a pump off pressure between 8 to 14 psi. The Slocum leak detector tests from 4 to 3 psi to determine a precision leak. For a pump with an off pressure equal to the pumping pressure, the device would not perform the precision test. For a pump with an off pressure condition that must be compensated for, even at a 3 gph test. This patent mentions the piping bulk modulus, (air) and describes different test times, but fails to relate the test time to a bulk modulus value. For fuel piping in continuous operation, the piping bulk modulus exhibits a constant value. However, the value must be determined, and the leak detector must have a capability, to adjust its performance in accordance with the pipings particular bulk modulus.

Line leak detectors that utilize flow, for piping leak determination, exhibit different performance characteristics than pressure decay devices. However, these devices are as sensitive to the primary obstacle to accurate line leak detection, that is temperature differential, as are pressure decay devices.

Referring to Gerstenmaier Et Al, the line leak detector therein described utilizes a flow detector in a bypass piping arrangement, thereby determining a leak. The test is commenced after 30 minutes of no product pumped through the piping under test. This design is the precursor of later designs using a micro-computer for control. The fundamental fault with this design, relates to temperature stabilization of the fluid under test. The 30 minute wait without pumping product, is insufficient by several order of magnitudes. Additionally flow is determined at a constant pressure, thereby requiring the pump to be on, during the duration of the test. Pulsation of the fluid under test defeats the desired normalized fluid temperature, by introducing heat into the fluid under test.

Referring to Maresca, Jr. Et At, patents dated Jan. 7 and Feb. 25, 1992, the line leak detector therein described, utilizes a modified flow concept. The intent is to eliminate heat induction into the test fluid, during the test cycle. For flow detection methods to work, a constant pressure is required during the flow test. The line leak detector therein described, uses a pressure chamber with an air head, to provide a relatively constant pressure during the flow test. Sets of 3 tests are performed. Flow is determined by the change of height of the test fluid, in the pressure chamber. The first and third tests are flow tested at the selected test pressure, their results are averaged. The second test is performed at zero pressure. It is assumed at zero pressure, no leakage will occur from a potential hole in the piping. The flow if any is then attributed to thermal expansion or contraction of the fluid. Flow again is measured by the change of column height in the test chamber. The average flow from test 1 and 3, is corrected by adding or subtracting test 2, depending on contraction or expansion of the test fluid, from thermal effects. An assortment of valves, pressure chamber, controllers, flow switches, piping, cabling are utilized to obtain the desired performance. The subsequent patent improves with a positive displacement pump and other methods. In addition to the overall complication of this approach, the assumption that fluid will not be lost from a leaking pipe at zero pressure, ignores the inherent pressure head, from the location of the pressure chamber.

OBJECTS OF THE INVENTION

Accordingly, it is the object of the present invention to provide an improved system for detection of a leak from underground pressurized fuel lines.

It is another object of the invention to provide a pressure decay line leak detection system that compensates for variances caused by temperature differentials between the fluid tested and the piping with surrounding soil.

It is another object of the invention to provide a pressure decay line leak detection system that is insensitive to variances of pump off residual piping pressure.

It is another object of the invention to provide a pressure decay line leak detection system that compensates for the variance in bulk modulus of different piping systems.

It is another object of the invention to provide a pressure decay line leak detection system that does not require the pump off pressure to be significantly lower than the pump on pressure, to perform a line leak test.

It is another object of the invention to provide a pressure decay line leak detection system that automatically determines when to perform a 3 gph and 0.2 gph tests.

It is another object of the invention to provide a pressure decay line leak detection system that encodes lights and horn by visible and audible means to enable a complete status of piping system to be determined.

It is another object of the invention to provide a pressure decay line leak detection system that does not require temperature sensors or sequential pressurization to perform the precision leak test (0.1 to 0.2 gph).

It is another object of the invention to provide a pressure decay line leak detection system that can be installed without requiring existing piping modification.

It is another object of the invention to provide a pressure decay line leak detection system suitable for a plurality of pressurized piping applications.

It is another object of the invention to provide a pressure decay line leak detection system that is low cost, reliable and easy to use.

Further objects and advantages of our invention will become apparent from a consideration of the drawings and the ensuing description.

DRAWING FIGURES DESCRIPTION

FIG. 1 System Installation and Wiring Communication Mode shows the installation of the leak detector when in the communication mode providing automatic pump activation and signaling to mating equipment.

Figure 2:
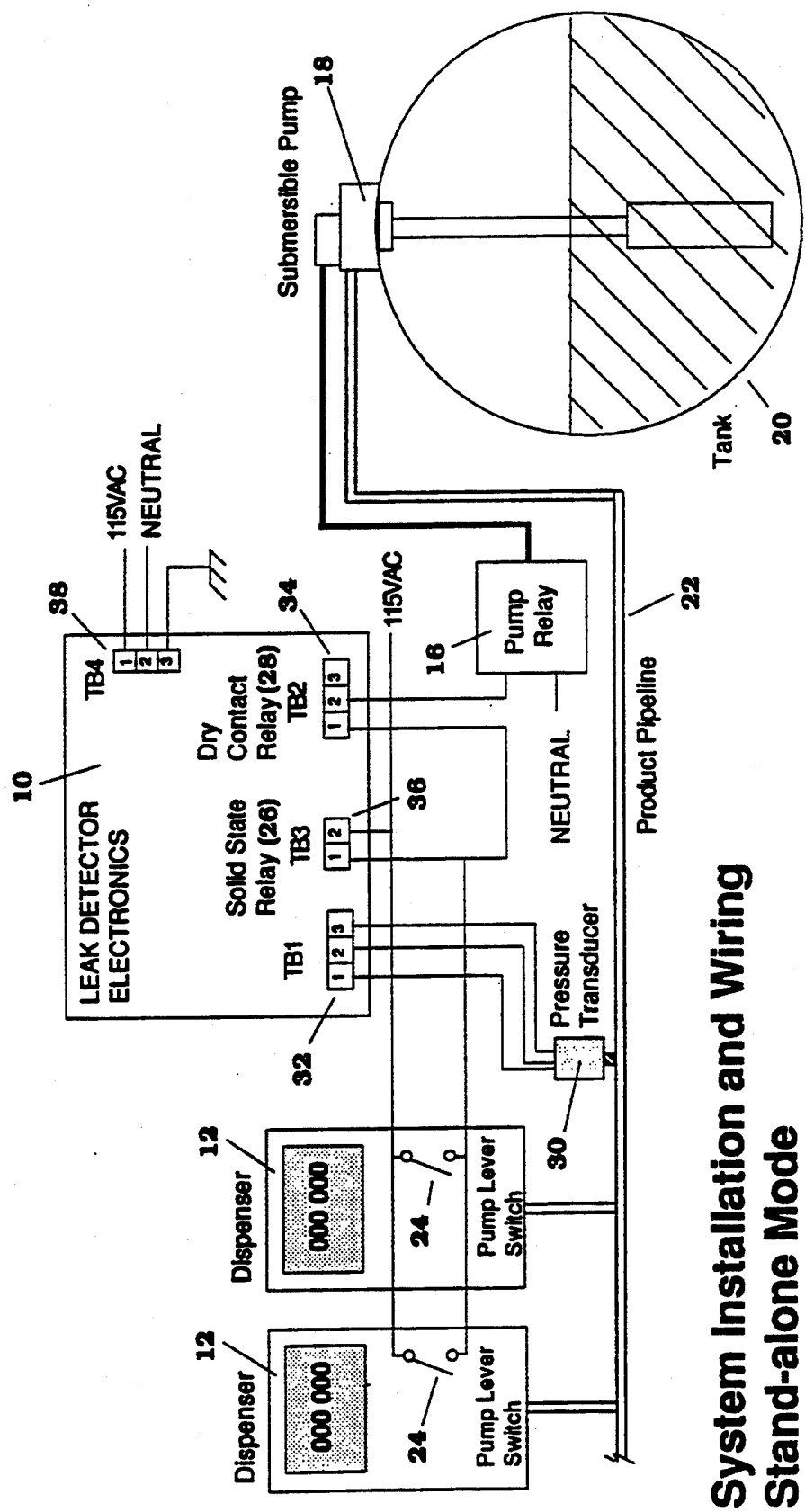

FIG. 2 System Installation and Wiring Stand-alone Mode shows the installation of the leak detector when in the stand alone mode providing automatic pump activation and automatic pump shutdown when a leak is detected.

Figure 3:
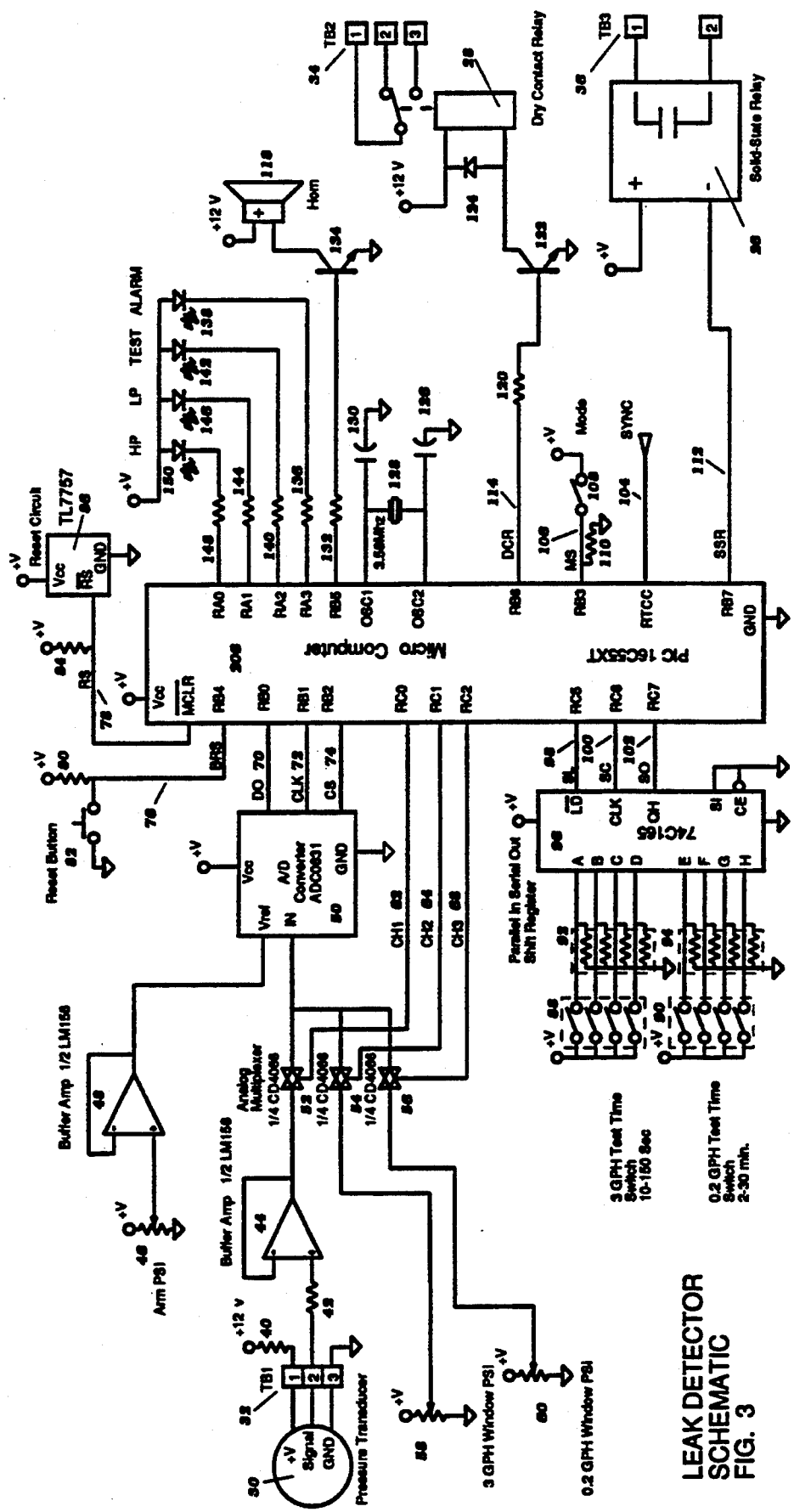
Figure 4:
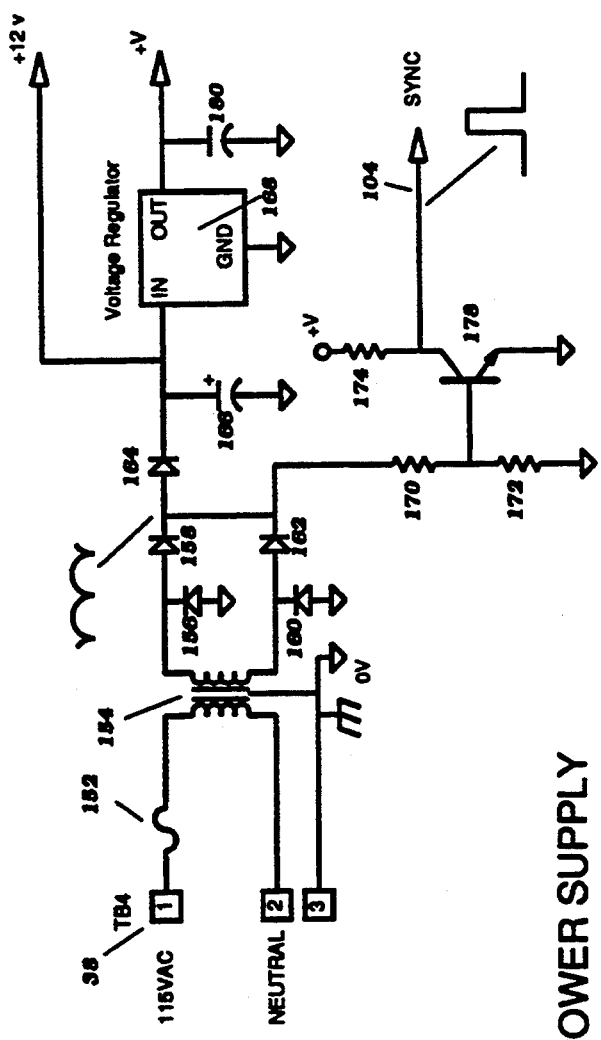

FIG. 3 Leak Detector Schematic
FIG. 4 Power Supply Schematic
FIG. 5 Flowchart Reset
FIG. 6 Flowchart Wait for Test
FIG. 7 Flowchart 3 GPH Test
FIG. 8 Flowchart 0.2 GPH Test
FIG. 9 Flowchart End Test
FIG. 10 Flowchart Update subroutine
FIG. 11 Flowchart A/D Input subroutine
FIG. 12 Flowchart Switch subroutine

LIST OF DRAWING REFERENCE NUMERALS

10 Leak Detector Electronics
12 Dispenser (not part of invention)
14 Mating Equipment (not part of invention)
16 Pump Relay (not part of invention)
18 Submersible Pump (not part of invention)
20 Tank (not part of invention)
22 Product Line (not part of invention)
24 Pump Lever Switch (not part of invention)
26 Solid State Relay
28 Dry Contact Relay
30 Pressure Transducer
32 Terminal Block TB1 Pressure Transducer
34 Terminal Block TB2 Dry Contact Relay
36 Terminal Block TB3 Solid State Relay
38 Terminal Block TB4 AC Power
40 Resistor
42 Resistor
44 Buffer Amplifier, ½ LM158
46 Variable Resistor
48 Buffer Amplifier, ½ LM158
50 A to D Converter
52 Transmission Gate, ¼ CD4066
54 Transmission Gate, ¼ CD4066
56 Transmission Gate, ¼ CD4066
58 Variable Resistor
60 Variable Resistor
62 CH1, Logic Signal
64 CH2, Logic Signal
68 CH3, Logic Signal
70 DO, Logic Signal
72 CLK, Logic Signal
74 CS, Logic Signal
76 BRS, Logic Signal
78 RS, Logic Signal
80 Resistor
82 Reset Button
84 Resistor
86 Reset Circuit, TL7757
88 Dip Switch 4 Position
90 Dip Switch 4 Position
92 Resistor Array
94 Resistor Array
96 Parallel In Serial Out Shift Register, 74C165
98 SL, Logic Signal
100 SC, Logic Signal
102 SO, Logic Signal
104 SYNC, Logic Signal
106 MS, Logic Signal
108 Switch
110 Resistor
112 SSR, Logic Signal
114 DCR, Logic Signal
118 Horn
120 Resistor
122 Transistor, NPN
124 Diode
126 Capacitor
128 Crystal, 3.58 Mhz
130 Capacitor
132 Resistor
134 Transistor, NPN
136 Resistor
138 Light Emitting Diode (Lamp)
140 Resistor
142 Light Emitting Diode (Lamp)
144 Resistor
146 Light Emitting Diode (Lamp)
148 Resistor
150 Light Emitting Diode (Lamp)
152 Fuse
154 Transformer
156 Rectifier
158 Rectifier
160 Rectifier
162 Rectifier
164 Rectifier
166 Capacitor
168 Voltage Regulator
170 Resistor
172 Resistor
174 Resistor
178 Transistor, NPN
180 Capacitor
206 Micro-Computer, PIC 16C55XT

DESCRIPTION OF INVENTION

Referring to FIG. 1, the following is a description of the leak detector communication mode installation to communicate with mating equipment 14. An installation site will include: a tank 20 containing liquid product, a submersible pump 18 to pump the product from the tank 20, a pump relay 16 which switches the high power to the pump 18 typically 230 VAC, a product line 22 to transport the product, and at least one dispenser 12. The leak detector is installed as follows: electronics 10 is connected to the pressure transducer 30 via terminal block 32 and the pressure transducer 30 is tapped into the product line 22 at any point along its length. The solid state relay 26 used to activate the pump relay 16 is wired in parallel with the pump lever switch 24, connections are made via terminal block 36. The leak detector electronics is powered by 115VAC connected to terminal block 38. The dry contact relay 28 used for signaling is connected to the mating equipment 14 through terminal block 34.

Referring to FIG. 2, the following is a description of the leak detector stand-alone mode installation to automatically shut down the pump 18 operation if a leak is detected. The installation site will include as mentioned above: a tank 20, a pump 18, a pump relay 16, a product line 22 and one or more dispensers 12. The leak detector electronics 10 is connected to the site in an identical manner to the communication mode for the power connection terminal block 34, solid state relay 26 and pressure transducer 30. The dry contact relay 28 normally closed contacts are wired in series with the control wire to the pump relay 16; this allows automatic shut down of pump 18.

Referring to FIG. 3, the pressure transducer 30 is connected via terminal block 32 to resistor 40, resistor 42 and system ground. Resistor 40 limits the maximum current supplied to the transducer 30 for intrinsic safety purposes. Resistor 42 connected to the buffer amp 44 input likewise limits current for intrinsic safety to the transducer 30, which might otherwise flow in the event of some circuit failure. The pressure transducer 30 outputs a signal proportional to the pressure contained in the product line 22. The output of buffer amp 44, which is required to prevent loading of the transducer signal, is connected to the transmission gate 52.

The variable resistor 46 is used to set a voltage equal to the pressure at which the leak detector will arm for a leak test. This pressure is typically set between the dispensing pressure, (the pressure maintained in the product line 22 with liquid being dispensed) and the catch pressure, (the pressure trapped in the product line 22 imediately following pump 18 shut down). The wiper of variable resistor 46 is connected to the buffer amp 48, which in turn is connected to the Vref input of the analog to digital converter 50. Buffer amp 48 provides a sufficiently low impedance voltage source as required by the Vref input.

Variable resistor 58 is used to set a voltage equal to the 3 GPH window pressure, (the allowed pressure drop from the catch pressure once the test has started). The wiper of variable resistor 58 is connected to the transmission gate 54.

Variable resistor 60 is used to set a voltage equal to the 0.2 GPH window pressure, (the allowed pressure drop from the catch pressure once the test has started). The wiper of variable resistor 60 is connected to the transmission gate 56.

The combination of transmission gates 52,54 and 56 form an analog multiplexer. Transmission gates 52,54 and 56 are all connected to the input of the analog to digital converter. To select a signal only one of the logic control lines CH1 62, CH2 64 or CH3 68 is set to a logic 1 (+v).

The eight bit analog to digital converter 50 is controlled by logic lines DO 70, CLK 72 and CS 74. The conversion cycle is initiated by setting CS 74 to logic 0 (0 v) followed by nine CLK 72 logic 1 (+v) to logic 0 (0 v) transitions. The first CLK 72 transition causes a start bit to be output on the DO 70 line. The next eight transitions causes the conversion results to be output on the DO 70 line with the most significant bit first and the least significant bit last. All conversions are made in reference to the Arm pressure setting, which is supplied to the Vref input via buffer amp 48. This means that pressures converted from the transducer 30 that are greater than or equal to the arm pressure will result in the maximum value output of FF hexadecimal from the converter 50. Pressures that are less than the arm pressure will be converted as a ratio of the arm pressure. For example, a pressure that is equal to one half of the arm pressure would result in a value of 7F hexadecimal, which is one half of the maximum value of FF hexadecimal. Configuring the analog to digital converter 50 in this manner maintains the conversion resolution at a constant percentage (0.39%) of the arm setting required at each installation site. Logic line CS 74 must be returned to logic 1(+v) prior to the next conversion cycle.

Dip switch 88 sets the test time to be used during the 3 GPH test. The binary combination of the switch section closures is interpreted by the program contained in the micro-computer 206 as a time of 10 seconds to 150 seconds. Resistor array 92 provides a pull down to a logic 0 (0 v) when a switch section is not closed. The four sections of dip switch 88 are connected to inputs A, B, C and D of shift register 96.

Dip switch 90 sets the test time to be used during the 0.2 GPH test. The binary combination of the switch section closures is interpreted by the program contained in the micro-computer 206 as a time of 2 minutes to 30 minutes. Resistor array 94 provides a pull down to a logic 0 (0 v) when a switch section is not closed. The four sections of dip switch 90 are connected to inputs E, F, G and H of shift register 96.

The shift register 96 provides a means of reading dip switches 88 and 90 using only three port lines, thereby conserving the limited number of port lines of the micro-computer 206 for other functions. To read the switches 88 and 90, the SL 98 logic line is set to logic 0 (0 v), then to logic 1 (+v), which loads the logic level on inputs A,B,C,D,E,F,G and H into the register for subsequent shifting out on logic line SO 102, by setting logic line SC 100 to a logic 1(+v), then to a logic 0(0 v). Immediately following the loading of the inputs, the H input logic level is present on the SO 102 line and can be read by the program in the micro-computer 206. The subsequent toggling of the SC 100 line, will cause the input logic levels of the remaining inputs to be presented on the SO 102 line, with the G input next and ending with the A input.

The reset button 82 serves as a means to signal, via the BRS 76 logic line, the program contained in micro-computer 206 when the lamp displays have been observed and can be cleared. When the reset button 82 is depressed the BRS 76 line is logic 0(0 v) otherwise the BRS 76 line is pulled up by resister 80 to logic 1(+v).

The reset circuit 86 provides a logic 0(0 v) reset pulse from the RS not output, when the electronics is first powered up. The RS not output, is connected to the MCLR not, hardware reset input, of the micro-computer 206 via the RS 78 line. Resistor 84 pulls up the RS 78 line to a logic 1(+v) following the reset pulse. The reset plus time duration should be sufficient to allow the oscillator circuitry to enter stable operation prior to its' termination.

The oscillator circuitry is comprised of crystal 128, capacitor 126, and capacitor 130. The oscillator circuitry is connected to the OSC1 and OSC2 pins of the micro-computer 206. Capacitors 126 and 130 provide the necessary phase shift for proper oscillator operation.

The light emitting diodes (also referred to as lamps) Test 142, LP 146 and HP 150 provide visual indication as to the status of the leak detector electronics 10. The following is the possible indications which may be displayed:

HP lamp 142 on continuously, indicates that the product line 22 pressure is greater than the arm pressure.

LP lamp 146 on continuously, indicates that the product line 22 pressure is less than the allow lower limit during a leak test or that the product line 22 pressure is less that 20% of the arm pressure prior to a test.

Test lamp 142 on continuously, indicates that a 3 GPH test is in progress.

Test lamp 142 blinking, indicates that a 0.2 GPH test is in progress.

Test lamp 142 flashing, indicates that a 0.2 GPH test has passed.

Alarm lamp 138 blinking, indicates that the 3 GPH test has failed or the product line 22 failed to catch sufficient pressure to conduct a test or the product line 22 failed to pressurize properly (Broken pipe).

Alarm lamp 138 flashing, indicates that a 0.2 GPH test has failed.

HP lamp 150 and LP lamp 146 both blinking, indicates that a test has not been conducted within the last 24 hours and that a failed transducer may be suspected.

Blinking is defined as a repeating cycle of the lamp on for one second and off for one second. Flashing is defined as a repeating cycle of the lamp on for one tenth of a second and off for nine tenths of a second.

The light emitting diodes 138, 142, 146 and 150 are connected to the micro-computer 206 outputs RA3, RA2, RA1 and RA0 through resistors 136, 140, 144 and 148 respectively, which provide current limiting. A logic 0(0 v) at outputs of the micro-computer 206 will cause the associated light emitting diode to illuminate.

Horn 118 provides an audio indication in conjunction with the alarm lamp 138. The Horn 118 is turned on for 1 second and then off for one second in a repeating cycle using the blink function of the program contained in the micro-computer 206. A logic 1 (+v) at the output RB5 of the micro-computer 206 causes the horn 118 to turn on by sourcing current through resistor 132 to the base of transistor 134, which in turn is a low side driver for the horn 118.

The dry contact relay 28 provides a means to shut down submersible pump 18 operation by interrupting the circuit to the pump relay 16 when in the stand-alone mode (Refer to FIG. 2).

The dry contact relay 28 also provides a means to signal mating equipment 14 by pulsing the contacts a specific number of times to signal a given test result when in the communication mode (Refer to FIG. 1).

The following are signals, which may be sent:

One pulse signals that the 3 GPH test has just passed.

Two pulses signals that the 3 GPH test has just failed or the product line 22 has failed to pressure up (possible broken pipe) or the product line 22 has failed to catch sufficient pressure for a test to be conducted (catastrophic leak).

Three pulses signals that the 0.2 GPH test just conducted has passed.

Four pulse signals that the 0.2 GPH test just conducted has failed.

A logic 1 (+v) on the DCR 114 logic line connected to output RB6 of the micro-computer 206, causes the dry contact relay 28 to activate by sourcing current through resistor 120 to the base of transistor 122, which in turn is the low side driver for the dry contact relay 28. Diode 124 across the coil of the dry contact relay 28 suppresses transients generated when transistor 122 is turned off. Connections to the dry contact relay 28 are made via the terminal block 34.

The solid state relay 26 provides a means to turn on the submersible pump 18 for 3 seconds when it is time to initiate a 0.2 GPH test (Refer to FIGS. 1&2). A logic 0(0 v) on the SSR 112 logic line connected to output RB7 of the micro-computer 206, causes the solid state relay 26 to activate. The program contained in the micro-computer 206 initiates a 0.2 GPH test after the submersible pump 18 has not been in operation for 4 hours. Connections to the solid state relay 26 are made via terminal block 36.

Switch 108 provides a means to signal to the program contained in micro-computer 206 as to the desired mode of operation. When switch 108 is closed logic line MS 106, which is connected to the RB3 input of the micro-computer 206 is set to a logic 1(+v) indicating to the program that the communication mode is desired. Pull down resistor 110 maintains the MS 106 line at a logic 0(0 v) when switch 108 is open indicating that the stand-alone mode of operation is desired.

Referring to FIG. 4 the power supply outputs two voltages and a logic signal used for timing by the micro-computer 206.

The +12 v supply voltage is used by the horn 118, the dry contact relay 28 and by the pressure transducer 30 after being fed through resistor 40.

The +V supply voltage is used by all other components.

The SYNC 104 logic signal is a pulse, which is generated for each half cycle of the 115 VAC supplied to transformer 154. For 115 VAC at 60 Hz the SYNC 104 pulse will occur every 8.33 Ms or at a 120 Hz rate. The SYNC 104 signal is connected to the RTCC input of the micro-computer 206. Internal to the micro-computer 206 is a hardware counter, which counts the number of SYNC 104 pulses arriving at the RTCC input. At a predetermined number of pulses the program contained in the micro-computer 206 will up-date its time keeping.

The external 115 VAC power is connected via the terminal block 38, which provides connections for: the hot 115 VAC to TB4-1, the neutral to TB-2, and a protective ground to TB-3. The 115 VAC is connected to transformer 154 via fuse 152 for primary circuit protection, a requirement for intrinsic safety. The neutral is connected directly to the transformer 154. The protective ground is connected to the core of transformer 154 and the power supply ground (0 v), also a requirement for intrinsic safety.

The secondary of transformer 154 is connected to rectifiers 156, 158, 160 and 162, which form a full wave bridge. The output of the bridge at the junction node of rectifiers 158 and 162 is connected to rectifier 164. Rectifier 164 provides decoupling between capacitor 166 and the output of the bridge to prevent distortion of the rectified waveform. The output of the bridge is fed to the voltage divider formed by resistors 170 and 172. The values of resistors 170 and 172 are selected such that the node between the resistors 170 and 172 will supply sufficient base drive to turn transistor 178 on at approximately one half of the bridge peak voltage. The collector of transistor 178 connected to resistor 174 is the source for the SYNC 104 signal.

Connected to capacitor 166 is the input of voltage regulator 168, which regulates the +V supply voltage (+5 volts was used for +V). Capacitor 180 at the output of voltage regulator 168 is required for high frequency bypass.

OPERATION OF INVENTION

Referring to FIG. 1, which shows a typical installation. The leak detector is best understood by describing a pumping cycle and how the leak detection tests relate to it.

The pumping cycle is initiated by the closure of a pump lever switch 24 thereby suppling 115 VAC to the winding of the pump relay 16. The pump relay 16 activates and supplies the high power to the submersible pump 18. The pump 18 now running, the product line 22, is pressurized in the range of 20 to 30 PSI with the liquid product drawn from tank 20. Assuming that the product line 22 pressure started at zero, the leak detector electronics 10, notes when the pressure reached a level greater than 20% of the arm pressure setting (Typ.3 PSI) and then allows 2 seconds for the pressure to attain a level greater than the arm pressure (Typ.15 PSI); if not, a pressure up failure is alarmed. The arm pressure setting is typically set half way between the catch pressure and the lowest dispensing pressure. During dispensing the HP lamp 150 is illuminated indicating the product line 22 pressure is above the arm pressure.

When dispensing is completed the pump lever switch 24 is opened de-energizing the pump relay 16, which in turn shuts down the submersible pump 18. The pressure in the product line 22 will fall rapidly until the catch pressure is reached (Typ. 10 PSI). The catch pressure is maintained in the product line 22 by a check and relief valve contained in the submersible pump 18. The pressure fall is detected by the leak detector electronics 10 by the fact that the pressure is no longer greater than the arm pressure. The HP lamp 150 is turned off and a 2 second delay is executed prior to initiating a test. The 2 second delay allows time for the relief valve to fully seat and the catch pressure to stabilize.

Following the 2 second delay one of two leak tests are performed. If the current dispensing cycle was less than 5 seconds and if dispensing has not occurred in the previous 4 hours then the 0.2 GPH test is performed, otherwise the 3 GPH test is performed. The short dispensing cycle of less then 5 seconds is automatically caused by the leak detector electronics 10 by closing the solid state relay 26 for 3 seconds when a dispensing cycle has not occurred within the previous 4 hours.

Assuming that the criteria for the 0.2 GPH test was met, the test lamp 142 is setup to blink indicating that the 0.2 GPH test is in progress. Next, the catch pressure (Typ. 10 PSI) is measured and recorded, followed by calculating the low limit pressure using the 0.2 GPH window setting (Typ. 2.5 PSI). The low limit is calculated by subtracting the window PSI from the recorded catch pressure (Low limit=Catch pressure−0.2 GPH Window). If the resulting low limit is equal to or less than zero then a catastrophic leak is alarmed. The test time is then calculated using the 0.2 GPH time dip switch 90 setting (Test time=0.2 GPH test time switch×2 minutes). The test timer is started using the calculated value. At this point the product line 22 pressure is continuously monitored until the test time has concluded. If the line 22 pressure drops below the low limit, the LP lamp 146 is illuminated. When the test timer has timed out the line 22 pressure is compared to the low limit and the test lamp 142 is turned off. If the pressure is below the low limit, then the test is logged as a failure, if not a pass is logged. The alarm lamp 138 is setup to flash to indicate a failed 0.2 GPH test. The test lamp 142 is set-up to flash to indicate a successful 0.2 GPH test.

The 3 GPH test operates in the same manner as the 0.2 GPH test with some exceptions. The test lamp 142 is illuminated continuously as an indication that a 3 GPH test is in progress. The 3 GPH window setting (Typ. 5 PSI) and the 3 GPH dip switch 88 setting are used to calculate the low limit and test time respectively. If the test fails the alarm lamp 138 is set-up to blink and the horn 118 is activated using the blink function.

At the conclusion of a test the leak detector electronics 10 will, depending on the mode selected by switch 108, communication or stand-alone, will signal to mating equipment 14 using the dry contact relay 28 or disable the pump 18. In the communication mode the dry contact relay 28 is pulsed a specific number of times to signal the test results. The signal pulses are generated by closing dry contact relay 28 for 1 second at 2 second intervals. In the stand-alone mode the dry contact relay 28 is used to disable the submersible pump 18 by interrupting the control circuit between the pump lever switch 24 and the pump relay 16 as shown in FIG. 2.

With the required relay operations complete the leak detector electronics 10 can return to monitoring the product line 22 for the next dispensing cycle.

The alarm indications for both the pressure up failure and catastrophic leak mentioned above are the same as the 3 GPH test failure.

It should be noted that the window pressure and test time are independently adjustable for both the 3 GPH and 0.2 GPH tests, which allows the leak detector to be set up to compensate for the bulk modulus of a given installation site. It is necessary that the parameters be independent between the two tests to allow the leak detector to be set-up to detect a given standard leak rate at a particular catch pressure. Laboratory tests have shown that different small leak rates do not scale linearly between pressures. The nonlinearity is due in part to the transition from turbulent to laminar flow along with surface tension effects of the liquid involved.

The catch pressure level that is trapped in the product line 22 is set by the mechanical relief valve in the submersible pump 18. Mechanical relief valves do wear, and as they do the catch pressure will change. The change has minimal effect because the window of pressure over which the leak test is performed is constant and the upper limit is dynamically set to begin at the particular catch pressure recorded at the start of each test.

The flow of the program contained in the micro-computer 206 is shown in FIG. 5 through FIG. 12. The discussion of the program will start with the subroutines of FIG. 10,11 and 12 because repeated references are made to them in other parts of the program.

The UPDATE subroutine (Referring to FIG. 10) is responsible for all the time keeping, automatic pump activation, lamp flashing and lamp/horn blinking. This subroutine is continuously being called by the main portion of the program. The time between calls is quite short, much less than the 8.33 Ms (120 Hz) rate at, which the hardware counter is incremented by the logic signal SYNC 104.

When UPDATE is entered the first decision is, if the hardware counter is equal to 6 then the timing is incremented, if not, jump to the last decision in the routine.

Following the yes branch, which occurs at a 20 Hz rate, the hardware counter is cleared and the RT counter incremented. If the RT counter is equal to 20, which occurs once a second, then the RT counter is cleared, the test timer is decremented and the clock incremented.

At this point the clock is checked for being equal to 4 hours and if it is, the 4 Hr flag is set. The 4 Hr flag will be used as a signal to the main program that a 0.2 GPH test can be performed. Then the clock is checked for being greater than 4:00:00 but less than 4:00:03, if so the solid state relay 26 is turned on. When the clock is no longer less than 4:00:03 then the solid state relay 26 is turned off. The solid state relay 26 is used for automatic pump activation as discussed earlier.

If the clock is equal to 24 hours then the 24 Hr flag is set. The 24 Hr flag is used by the main program to determine if a test cycle has been performed in the last 24 hours.

Next, if the RT counter is less than 2, then all the lamps 138,142 that have their flash flag set will be turned on, otherwise they will be turned off. The RT counter repeats its' 20 count cycle in one second, which means flashing lamps will be on for 0.1 second and off 0.9 second.

Next, lamps 138,142,146,150 with their blink flags set and the horn 118 if its' blink flag is set are cycled. If the least significant bit of the seconds register of the clock is logic 1, then the lamps / horn 118 will be turned on, if not, they are turned off. The least significant bit of the seconds register toggles once a second, therefore blinking will be on for one second then off for one second.

The last decision is to determine if the button reset is depressed. If the BRS 76 logic line is equal to logic 0, then the program leaves the routine by going to BUTTON RESET in the main program, otherwise a normal return to the calling portion of the main program is performed.

Referring to FIG. 11

The A/D INPUT subroutine inputs the eight bit conversion value from the analog to digital converter 50.

To start the conversion cycle both the CS 74 and CLK 72 logic line are set to logic 0.

Next, a counter is set to eight to keep track of the bits as they are input.

The CLK 74 logic line is set to logic 1 then to logic 0, to clock passed the start bit prior to collecting the data bits.

The CLK 74 logic line is again set to a logic 1 then to 0. The fist data bit is now present on the DO 70 logic line.

The bit is input from the DO 70 logic line and saved with the first bit as the most significant bit and the last bit the least significant.

The counter is decremented and then checked for zero to determine if the last bit has been input. If the counter is equal to 0, indicating that the last bit has been stored, then the CS 74 logic line is set to logic 1 and a return performed. If the counter is not zero then the next bit is input.

The READ TRANSDUCER subroutine selects the transducer input, calls the A/D INPUT subroutine, then saves the transducer value for future reference.

The logic line CH1 62 is set to a logic 1 and lines CH2 64 and CH3 68 are both set to logic 0. This selects the transducer for conversion via the analog muliplexer formed by transmission gates 52,54, and 56.

The A/D INPUT subroutine is called and then the transducer value is saved.

The READ 3 GPH WINDOW subroutine selects the 3 GPH window setting, calls the A/D INPUT routine and then saves the value before returning.

The 3 GPH setting is selected by setting logic line CH2 64 to a logic 1 and lines CH1 62 and CH3 68 to logic 0.

The READ 0.2 GPH WINDOW subroutine selects the 0.2 GPH window setting, calls the A/D INPUT routine and then saves the value before returning.

The 0.2 GPH setting is selected by setting logic line CH3 68 to a logic 1 and lines CH1 62 and CH2 64 to logic 0.

Referring to FIG. 12

The SWITCH subroutine loads the 3 GPH test time value from dip switch 88 and the 0.2 GPH test time value from dip switch 90 into shift register 96, clocks the bits in from the register 96 and saves the first four bits as the 0.2 GPH test time and the last four bits as the 3 GPH test time before returning.

The SL 98 logic line is set to logic 1 then to logic 0. This loads the dip switch setting into register 96.

A counter is set to eight to provide a means to keep track of the bits as they are input.

With the register 96 loaded, the first bit can be input from the SO 102 logic line and saved with the first bit in as the least significant bit and the last bit the most significant.

The register 96 is clocked to the next bit by setting the SC 100 logic line to logic 1 then to logic 0 and the counter is decremented.

If the counter is equal to zero then both the four bit values for the 3 GPH and 0.2 GPH test times are saved and a return performed, otherwise the next bit is input.

Referring to FIG. 5

RESET is the starting point of the main program when the power is first turned on. The first step is basic housekeeping: the port directions are set, the port outputs are set to their initial logic states, all variables cleared, the clock and timers set to zero along with all flags cleared.

The subroutine SWITCH is called to input the test times.

The subroutine UPDATE is called to up-date all timing functions. The 24 Hr flag is checked and if it is set then the HP 150 and LP 146 lamp's blink flags are set. This is an indication that a leak test has not been performed in the last 24 hours. If it is known that a dispensing cycle has occurred within the last 24 hours then a transducer failure can be suspected.

The READ TRANSDUCER subroutine is called. If the transducer value is greater than 20% of the arm pressure then proceed to the next step, otherwise set the LP lamp 146 on and return to previous call UPDATE.

A timer is loaded for 2 seconds which is the same timer used by the leak tests referred to as the test timer.

The UPDATE subroutine is again called to up-date the timing functions.

If the timer is equal to zero then the program goes to FAIL P.U., which means that the product line 22 failed to pressurize within 2 seconds and a broken pipe is suspected.

If the transducer value is greater than the arm pressure then the program proceeds to WAIT FOR TEST.

When the reset button 82 is depressed the program is restarted at the BUTTON RESET entry point, which turns the dry contact relay 28 off to clear a submersible pump 18 shut down.

When a leak test is completed, the program is restarted at the RESTART entry point. At which time the 24 Hr flag is cleared indicating that a leak test has been performed. The clock is also cleared.

Referring to FIG. 6

At this point the product line 22 is pressurized and a leak test will be performed when the submersible pump 18 is shut down.

A timer is loaded for 5 seconds.

The HP lamp 150 is turned on and the LP lamp 146 off.

The UPDATE subroutine is called to up-date the timing functions.

The timer is checked for being equal to zero. If it is then the 4 Hr flag is cleared to prevent a 0.2 GPH test from being performed, because with the pump 18 on for greater than 5 seconds the temperature stability has been disturbed.

The 24 Hr flag is checked, if it is set, then both the HP 150 and LP 146 lamp's blink flags are set. This is an indication that the pump 18 appears to have been operating continuously for the last 24 hours; if it is known that the pump 18 has been off within the last 24 hours then a transducer failure can be suspected.

The READ TRANSDUCER subroutine is called and if the transducer value is less than the arm pressure, proceed to the next steps, if not return to the preceding UPDATE call.

With the pressure less than the arm pressure the HP lamp 150 is turned off.

Both the READ 3 GPH WINDOW and READ 0.2 GPH WINDOW subroutines are called to input the current test window settings.

A 2 second delay is performed to allow the catch pressure to stabilize. The 4 Hr flag is checked. If the 4 Hr flag is set then the program goes to 0.2 GPH TEST, otherwise it goes to 3 GPH TEST.

Referring to FIG. 7

Assuming that the 4 Hr flag was set, the 0.2 GPH test starts by setting the blink flag for the Test lamp 142.

The transducer value is read by calling the READ TRANSDUCER subroutine, which is the catch pressure.

The low limit is calculated by subtracting the 0.2 GPH window setting from the transducer reading. If the resulting low limit is equal to or below zero then the product line 22 has failed to catch sufficient pressure to conduct a test. Therefore a catastrophic leak must be present in the product line 22.

The test time is calculated by multiplying the dip switch 90 value by 2, the resulting value is interpreted as minutes.

The calculated time is loaded into the test timer and the timer is started.

Next, READ TRANSDUCER is called to read the transducer value and UPDATE called to up-date the timing functions. If the transducer value is below the low limit the LP lamp 146 is turned on. If the test timer is equal to zero then the test is over, otherwise return to the previous call UPDATE step.

With the test over the blink flag for the Test lamp 142 is cleared and a final reading of the transducer is made. If the last Transducer reading is less than the low limit, the test failed and the program goes to FAIL 0.2 GPH. If the final transducer reading is not below the low limit, the test passed, and the program proceeds to PASS 0.2 GPH.

Referring to FIG. 8

Assuming that the 4 Hr flag was not set, the 3 GPH test starts by turning Test lamp 142 on.

The transducer value is read by calling the READ TRANSDUCER subroutine, which is the catch pressure.

The low limit is calculated by subtracting the 3 GPH window setting from the transducer reading. If the resulting low limit is equal to or below zero then the product line 22 has failed to catch sufficient pressure to conduct a test. Therefore acatastrophic leak must be present in the product line 22.

The test time is calculated by multiplying the dip switch 88 value by 10, the resulting value is interpreted as seconds.

The calculated time is loaded into the test timer and the timer is started.

Next, READ TRANSDUCER is called to read the transducer value and UPDATE called to up-date the timing functions. If the transducer value is below the low limit, the LP lamp 146 is turned on. If the test timer is equal to zero then the test is over, otherwise return to the previous call UPDATE step.

With the test over Test lamp 142 is turned off. A final reading of the transducer is made. If the last Transducer reading is less than the low limit, the test failed and the program goes to FAIL 3 GPH. If the final transducer reading is not below the low limit, the test passed, and the program proceeds to PASS 3 GPH.

Referring to FIG. 9

Whenever there is a failure detected or the results of a test to report the program execution is routed through this section of the program. If the operating mode is set for communication mode (MS 106=1) then the particular results are signaled via the dry contact relay 28. If set for the stand-alone mode (MS 106=0) then the dry contact relay 28 is activated to disable the submersible pump 18.

Following the FAIL 0.2 GPH entry point, the flash flag is set for the Alarm lamp 138 and the counter is set to the value 4.

Following the PASS 0.2 GPH entry point the flash flag is set for the Test lamp 150 and the counter set to 3.

Following the PASS 3 GPH entry point the blink flags are cleared and the counter set to 1.

The three preceding entry points converge to a mode decision. If logic line MS 106 is equal to 1 then the communication mode is selected and the test results are signaled to the mating equipment 14. If the MS 106 is not equal to 1 then the program goes to RESTART.

Signaling to the mating equipment 14 is accomplished by setting the dry contact relay 28 on, delaying one second and then setting the relay 28 off followed by another delay of one second. The counter is decremented and then checked for zero, if it is not, the relay 28 is again cycled on and then off. The number of cycles is determined by the number set in the counter by each entry point.

With the signaling is complete the program resumes monitoring for the next dispensing cycle by going to RESTART.

Following the FAIL P.U. entry point the blink flag for the HP lamp 150 is set and then goes to the FAIL 3 GPH entry point.

Following the CAT FAILURE entry point the blink flag for the LP lamp 146 is set and then goes to the FAIL 3 GPH entry point.

Following the FAIL 3 GPH entry point the blink flags for the Alarm lamp 138 and the horn 118 are set and the counter is set to 2. The operating mode is then determined. If logic line MS 106 is 1 then the results are signaled as described above and the program goes to RESTART. If logic line MS 106 is not 1 then the dry contact relay 28 is turned on to disable the submersible pump 18 and then the program goes to RESTART.

CONCLUSION AND SCOPE

Federal and State laws require that underground pressurized fuel lines be continuously tested for 3 gph leaks and periodically tested for 0.1 or 0.2 gph leaks. Pressurized fuel lines pose a greater environmental risk, because even a small hole in piping can result in large volume spills. Compliance with the federal and state regulations, is difficult because of the financial burden on hundreds of thousands of fuel dispensing locations.

Existing fuel dispensing facilities experience a greater cost impact than new construction because of the relatively high cost of breaking concrete and excavation. Numerous patents have attempted to describe a solution, however performance, with affordable cost, as the market place demands has yet to be attained. The pressure decay line leak detector, yields the performance required and at an affordable cost.

We claim:

1. A pressure decay leak detection circuit for a piping system comprising:
    pressure measurement means for measuring a fluid pressure in the piping system and providing an electrical signal representing the measured pressure;
    window setting means for variably defining a pressure window value representing an allowable loss in line pressure during a pressure decay leak detection test performed by the circuit;
    test time setting means for variably specifying a defined testing period prior to initiation of a test;
    pump monitoring means for monitoring the activation of a pump pressurizing fluid in the piping system;
    indication means for indicating leak detection test results to piping system operating personnel; and
    window testing control means, connected to said pressure measurement means, said window setting means, said pump monitoring means, and said indication means, for monitoring fluid pressure in the piping system, and upon detecting a predetermined reduction of fluid pressure in the piping system: recording a catch pressure measured by said pressure measurement means, monitoring pressure decay in said piping system using said pressure measurement means during a defined testing period; and activating said indication means to indicate a test failure if pressure in said piping system decays below a value based on said pressure window value before the expiration of said defined testing period.

2. The circuit of claim 1 further comprising test time setting means for selectively adjusting said defined testing period prior to initiation of a test, said test time setting means adjustment operating independently from the operation of said window setting means.

3. The circuit of claim 2 wherein said test time setting means comprises bulk modulus compensation means for setting a testing period varying with a piping bulk modulus of the piping system.

4. The circuit of claim 3 wherein said bulk modulus compensation means comprises means for selecting one of a plurality of predetermined testing periods varying with the piping bulk modulus of the piping system.

5. The leak detection circuit of claim 1, further comprising multitest control means for selectively performing one of a plurality of leak detection tests having different leak sensitivities.

6. The circuit of claim 5 further comprising automatic activation means for initiating a leak detection test after a defined waiting period has elapsed with the pump monitoring means indicating that no fluid has been pumped in the monitored piping system.

7. The circuit of claim 6 further comprising automatic line pressurization means connected to the automatic activation means for activating the pump associated with the piping system for a pumping period sufficient to pressurize the piping system for a leak detection test, but less than a pumping period that would result in heating fluid in the piping system.

8. The circuit of claim 7 wherein the automatic line pressurization means activates the pump for less than five seconds.

9. The circuit of claim 5 wherein said multitest control means comprises means for automatically performing a first leak detection test after said pump monitoring means detects the completion of a pumping operation, and said multitest control means comprises means for selectively performing a second leak detection test having greater leak sensitivity than said first leak detection test instead of said first leak detection test when an elapsed time since a last detected pumping operation is greater than said defined waiting period.

10. The circuit of claim 9 further comprising means for setting a first pressure window value and first testing period associated with said first leak detection test and a second pressure window value and second testing period associated with said second leak detection test.

11. The circuit of claim 9 wherein said multitest control means comprises means for initiating said first test after completion of each pumping operation in the piping system except when said elapsed time since the last monitored pumping operation is greater than said defined waiting period.

12. The circuit of claim 1 further comprising catastrophic leakage detection means connected to said pressure measurement means and to said indicating means for providing an indication if the measured catch pressure is below a predetermined range.

13. The circuit of claim 1 further comprising pressurization failure detection means connected to said pressure measurement means and to said indicating means for providing an indication if a measured pressure in the piping system does not exceed a programmed minimum pressure setting within a programmed time period.

14. The circuit of claim 13 wherein said pressurization failure detection means comprises means for initiating measurement of said programmed time period upon a detected activation of the pump and said pressurization failure detection means provides said indication if the measured pressure in the piping system does not exceed the programmed minimum pressure within said programmed time period following detection of activation of the pump.

15. The circuit of claim 1 further comprising transducer failure detection means connected to said pressure measurement means, said pump monitoring means, and said indicating means for providing an output indication if said pressure measurement means does not produce an output signal within a programmed time interval after an activation of the pump.

16. The circuit of claim 1 further comprising interface means for signaling test results and operational status of the circuit to external monitoring circuits.

17. The circuit of claim 1 wherein said indication means comprises a plurality of indicating lamps and lamp control means for controlling the lamps to indicate circuit operating status by controlling a duty cycle of illumination of at least one of the lamps.

18. The circuit of claim 17 wherein said lamps comprise lamps for indicating attainment of a high pressure level, attainment of a low pressure level, test in progress, and an alarm condition.

19. The circuit of claim 17 wherein said lamp control means includes means for selectively operating said lamps in one of at least four different duty cycle modes: continuous off, continuous on, blinking at a first duty cycle, and blinking at a second duty cycle different from said first duty cycle.

20. A pressure decay leak detection circuit for a piping system comprising:
  pressure measurement means for measuring a fluid pressure in the piping system and providing an electrical signal representing the measured pressure;
  window setting means for defining a pressure window value representing an allowable loss in line pressure during a pressure decay leak detection test performed by the circuit;
  pump monitoring means for monitoring the activation of a pump pressurizing fluid in the piping system;
  indication means for indicating leak detection test results to piping system operating personnel; and
  dynamic window testing control means, connected to said pressure measurement means, said window setting means, said pump monitoring means, and said indication means, for monitoring fluid pressure in the piping system, and upon detection of a predetermined reduction in fluid pressure in the piping system: recording a catch pressure measured by said pressure measurement means, subtracting said pressure window value from said catch pressure to obtain a dynamic test value for the test in progress; monitoring pressure decay in said piping system using said pressure measurement means during a defined testing period; and activating said indication means to indicate a test failure if pressure in said piping system decays below said dynamic test value before the expiration of said defined testing period.

21. The circuit of claim 20 further comprising test time setting means for selectively adjusting said defined testing period prior to initiation of a test, said test time setting means adjustment operating independently from the operation of said window setting means.

22. The circuit of claim 21 wherein said test time setting means comprises bulk modulus compensation means for setting a testing period varying with a piping bulk modulus of the piping system.

23. The circuit of claim 22 wherein said bulk modulus compensation means comprises means for selecting one of a plurality of predetermined testing periods varying with the piping bulk modulus of the piping system.

24. The leak detection circuit of claim 20, further comprising multitest control means for selectively performing one of a plurality of leak detection tests having different leak sensitivities.

25. The circuit of claim 24 further comprising automatic activation means for initiating a leak detection test after a defined waiting period has elapsed with the pump monitoring means indicating that no fluid has been pumped in the monitored piping system.

26. The circuit of claim 25 further comprising automatic line pressurization means connected to the automatic activation means for activating the pump associated with the piping system for a pumping period sufficient to pressurize the piping system for a leak detection test, but less than a pumping period that would result in heating fluid in the piping system.

27. The circuit of claim 26 wherein the automatic line pressurization means activates the pump for less than five seconds.

28. The circuit of claim 27 wherein the automatic line pressurization means activates the pump for more than two seconds and less than five seconds.

29. The circuit of claim 24 wherein said multitest control means comprises means for automatically performing a first leak detection test after said pump monitoring means detects the completion of a pumping operation, and said multitest control means comprises means for selectively performing a second leak detection test having greater leak sensitivity than said first leak detection test instead of said first leak detection test when an elapsed time since a last detected pumping operation is greater than said defined waiting period.

30. The circuit of claim 29 wherein said multitest control means comprises means for initiating said first test after completion of each pumping operation in the piping system except when said elapsed time since the last monitored pumping operation is greater than said defined waiting period.

31. The circuit of claim 24 wherein said multitest control means comprises means for automatically performing a first leak detection test after said pump monitoring means detects the completion of a pumping operation, and said multitest control means comprises means for selectively performing a second leak detection test having greater leak sensitivity than said first leak detection test instead of said first leak detection test when an elapsed time since a last detected pumping operation is greater than said defined waiting period and a period of pump activation is less than a predetermined time.

32. The circuit of claim 24 further comprising means for setting a first pressure window value and first testing period associated with said first leak detection test and a second pressure window value and second testing period associated with said second leak detection test.

33. The circuit of claim 20 further comprising catastrophic leakage detection means connected to said pressure measurement means and to said indicating means for providing an indication if the measured catch pressure is below a predetermined range.

34. The circuit of claim 20 further comprising pressurization failure detection means connected to said pressure measurement means and to said indicating means for providing an indication if a measured pressure in the piping system does not exceed a programmed minimum pressure setting within a programmed time period.

35. The circuit of claim 34 wherein said pressurization failure detection means comprises means for initiating measurement of said programmed time period upon a detected activation of the pump and said pressurization failure detection means provides said indication if the measured pressure in the piping system does not exceed the programmed minimum pressure within said programmed time period following detection of activation of the pump.

36. The circuit of claim 20 further comprising transducer failure detection means connected to said pressure measurement means, said pump monitoring means, and said indicating means for providing an output indication if said pressure measurement means does not produce an output signal within a programmed time interval after an activation of the pump.

37. The circuit of claim 20 further comprising interface means for signaling test results and operational status of the circuit to external monitoring circuits.

38. The circuit of claim 20 wherein said indication means comprises a plurality of indicating lamps and lamp control means for controlling the lamps to indicate circuit operating status by controlling a duty cycle of illumination of at least one of the lamps.

39. The circuit of claim 38 wherein said lamps comprise lamps for indicating attainment of a high pressure level, attainment of a low pressure level, test in progress, and an alarm condition.

40. The circuit of claim 38 wherein said lamp control means includes means for selectively operating said lamps in one of at least four different duty cycle modes: continuous off, continuous on, blinking at a first duty cycle, and blinking at a second duty cycle different from said first duty cycle.

41. A process for detecting leaks in a piping system, comprising the steps of:
providing a pressure decay leak detection circuit for measuring a fluid pressure in the piping system;
defining a pressure window value as an input to said pressure decay leak detection circuit to represent an allowable loss in line pressure during a pressure decay leak detection test performed by the circuit;
monitoring fluid pressure in the piping system, and upon detecting a reduction in pressure indicating cessation of fluid flow, recording a catch pressure measured by said pressure measurement means;
subtracting said pressure window value from said catch pressure, subsequent to the step of recording the catch pressure, to obtain a dynamic test value for the test in progress;
after obtaining the dynamic test value, monitoring pressure decay in said piping system using the circuit during a defined testing period; and
providing a test failure indication to piping system operating personnel if pressure in said piping system decays below said dynamic test value before the expiration of said defined testing period.

42. The process of claim 41 comprising the further step, prior to a leakage testing operation, of adjusting the pressure window value and the length of said defined testing period according to a piping bulk modulus value associated with the particular piping system under test.

43. A pressure decay leak detection circuit for a piping system comprising:
pressure measurement means for measuring a fluid pressure in the piping system and providing an electrical signal representing the measured pressure;
pump monitoring means for monitoring the activation of a pump pressurizing fluid in the piping system;
indication means for indicating leak detection test results to piping system operating personnel;
testing means, connected to said pressure measurement means, said pump monitoring means, and said indication means, for monitoring fluid pressure in the piping system, and upon detecting a predetermined reduction of fluid pressure in the piping system: recording a catch pressure measured by said pressure measurement means, monitoring pressure decay in said piping system using said pressure measurement means during a defined testing period; and activating said indication means to indicate a test failure if pressure in said piping system decays more than a defined amount before the expiration of a defined testing period;
multitest control means connected to said testing control means for measuring elapsed time between consecutive pumping operations, automatically performing a first leak detection test after said pump monitoring means detects the completion of a pumping operation, and selectively automatically performing a second leak detection test having greater leak sensitivity than said first leak detection test when the elapsed time since a last detected pumping operation is greater than said defined waiting period.

44. The circuit of claim 43 further comprising automatic line pressurization means connected to the multitest control means and to a control circuit of the pump associated with the piping system for selectively activating the pump for a pumping period sufficient to pressurize the piping system for a leak detection test, but less than a pumping period that would result in heating fluid in the piping system.

45. The circuit of claim 44 wherein the automatic line pressurization means activates the pump for less than five seconds.

46. The circuit of claim 43 further comprising means for setting a first said defined amount of pressure decay and first testing period associated with said first leak detection test and a second said defined amount of pressure decay and second testing period associated with said second leak detection test.

* * * * *